(12) United States Patent
Chong

(10) Patent No.: US 12,688,213 B2
(45) Date of Patent: Jul. 21, 2026

(54) DOCUMENT COLLECTION, ANSWER EXTRACTION, AND DATA GRAPH DISPLAY SYSTEMS AND METHODS

(71) Applicant: iCYLON, LLC, Vienna, VA (US)

(72) Inventor: Kyu Chong, Vienna, VA (US)

(73) Assignee: ICYLON, LLC, Vienna, VA (US)

( * ) Notice: Subject to any disclaimer, the term of this patent is extended or adjusted under 35 U.S.C. 154(b) by 0 days.

(21) Appl. No.: 18/608,399

(22) Filed: Mar. 18, 2024

(65) Prior Publication Data

US 2025/0291827 A1 Sep. 18, 2025

(51) Int. Cl.
*G06F 16/334* (2025.01)
*G06F 16/338* (2019.01)

(52) U.S. Cl.
CPC ........ *G06F 16/3344* (2019.01); *G06F 16/338* (2019.01)

(58) Field of Classification Search
CPC ............................ G06F 16/3344; G06F 16/338
USPC .......................................................... 707/730
See application file for complete search history.

(56) References Cited

U.S. PATENT DOCUMENTS

| | | | | | |
|---|---|---|---|---|---|
| 9,361,139 | B1 * | 6/2016 | Baig | ..................... | G06F 9/5077 |
| 2002/0118214 | A1 * | 8/2002 | Card | ..................... | G06F 16/954 |
| | | | | | 345/619 |

| | | | | | |
|---|---|---|---|---|---|
| 2013/0262449 | A1 * | 10/2013 | Arroyo | ............... | G06F 16/2453 |
| | | | | | 707/722 |
| 2014/0250377 | A1 * | 9/2014 | Bisca | ..................... | G06F 16/93 |
| | | | | | 715/705 |
| 2014/0298199 | A1 * | 10/2014 | Johnson, Jr. | ......... | G06Q 10/101 |
| | | | | | 715/753 |
| 2014/0358922 | A1 * | 12/2014 | Alkov | ................. | G06F 16/3329 |
| | | | | | 707/737 |
| 2015/0324454 | A1 * | 11/2015 | Roberts | ............. | G06F 16/24578 |
| | | | | | 707/734 |
| 2020/0380215 | A1 * | 12/2020 | Kannan | ................. | G10L 15/005 |
| 2022/0374479 | A1 * | 11/2022 | Xiong | .................... | G06N 5/022 |
| 2023/0359825 | A1 * | 11/2023 | Ramsl | ................. | G06N 3/0475 |
| 2024/0095445 | A1 * | 3/2024 | Sharma | ................. | G06F 40/166 |
| 2024/0256582 | A1 * | 8/2024 | Jain | .................... | G06F 16/3329 |
| 2024/0273289 | A1 * | 8/2024 | Li | ............................ | G06N 3/04 |
| 2024/0289554 | A1 * | 8/2024 | Galli | .................... | G06F 16/954 |

* cited by examiner

*Primary Examiner* — Kimberly L Wilson
(74) *Attorney, Agent, or Firm* — Lempia Summerfield Katz LLC

(57) ABSTRACT

In a method for providing a visual representation of search results, a natural language query may be obtained from a user. The natural language query may be processed to obtain key query terms. Based on the key query terms, a relevance-ranked search on a plurality of documents may be performed to obtain a subset of the plurality of documents relevant to the natural language query. Answers to the natural language query may be extracted from relevant documents among the subset of documents, and graph data may be obtained using document links associated with the relevant documents from which the answers were extracted. The graph data may include entities and relationships identified in the relevant documents. The graph data may be used to generate a graph that may be displayed to the user to enable the user to discover information previously unknown to the user.

20 Claims, 14 Drawing Sheets

| Obtain multiple seed terms | 802 |

| Apply a prioritization protocol | 804 |

| Instance a query session | 810 |

| Instance multiple search agent routines | 812 |

| Generate search result documentation | 814 |

| Instance a scraper session | 830 |

| Instance multiple scraper agent routines | 832 |

| Obtain scraped result data | 834 |

| Perform curation of scraped result data | 850 |

| Perform ML operations on scraped result data | 852 |

| Compare graph data to a baseline dataset | 854 |

*FIG. 8*

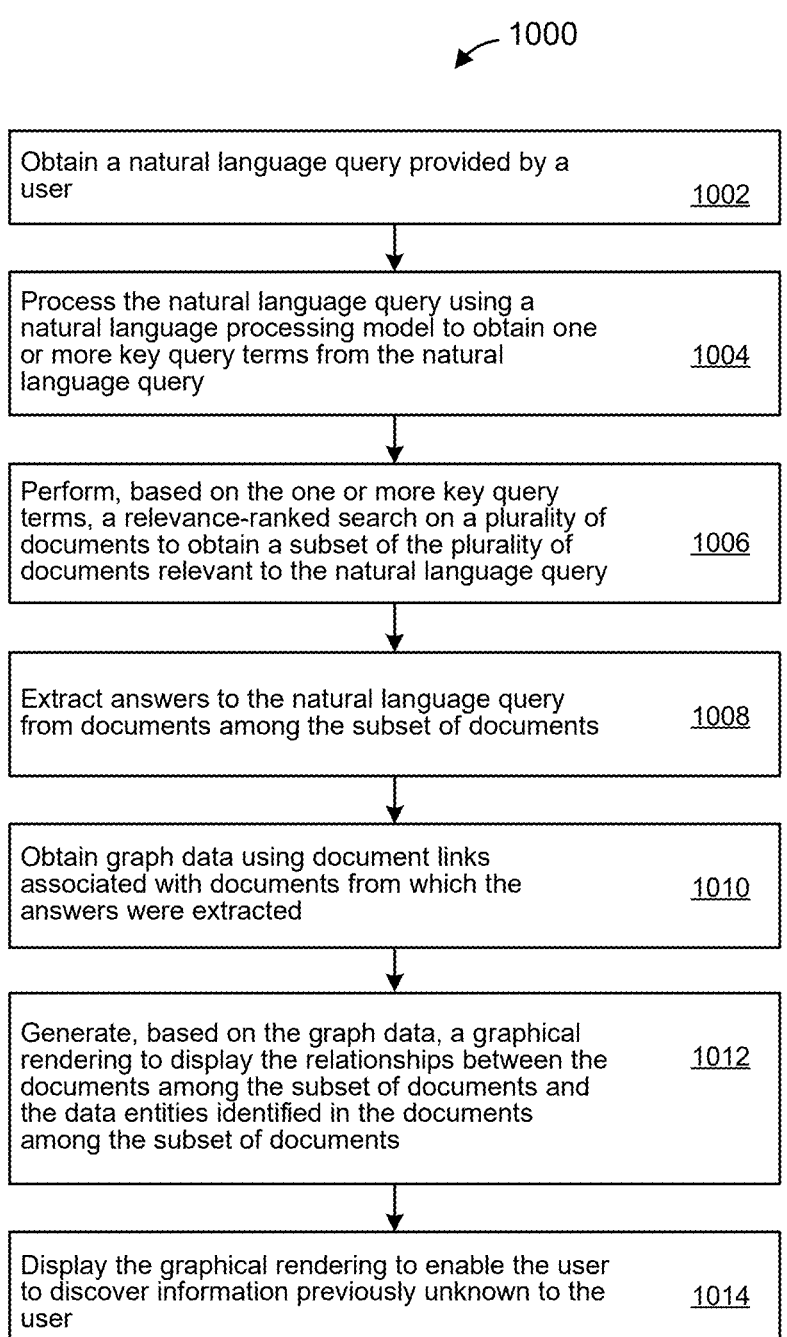

┌─ 1000

| Obtain a natural language query provided by a user | 1002 |

↓

| Process the natural language query using a natural language processing model to obtain one or more key query terms from the natural language query | 1004 |

↓

| Perform, based on the one or more key query terms, a relevance-ranked search on a plurality of documents to obtain a subset of the plurality of documents relevant to the natural language query | 1006 |

↓

| Extract answers to the natural language query from documents among the subset of documents | 1008 |

↓

| Obtain graph data using document links associated with documents from which the answers were extracted | 1010 |

↓

| Generate, based on the graph data, a graphical rendering to display the relationships between the documents among the subset of documents and the data entities identified in the documents among the subset of documents | 1012 |

↓

| Display the graphical rendering to enable the user to discover information previously unknown to the user | 1014 |

*FIG. 10*

DOCUMENT COLLECTION, ANSWER EXTRACTION, AND DATA GRAPH DISPLAY SYSTEMS AND METHODS

FIELD OF TECHNOLOGY

This disclosure relates to data collection, answer extraction, and data graph systems and methods for obtaining information relevant to user natural language queries for further analysis and/or processing.

BACKGROUND

Recent decades have brought tremendous growth of Internet and data storage technologies and usage. The creation of new information has grown at an exponential rate. In 2021, average internet traffic was estimated to exceed 700 terabytes per second. The sheer volume of data created constantly creates demand for high-throughput systems for categorization and cataloging of information. Accordingly, improvements in data collection, processing, analysis, and visualization systems incorporating Large Language Models (LLMs), Machine Learning (ML), Artificial Intelligence (AI), and Question and Answer (QA) Bots will continue to drive demand for these technologies.

SUMMARY

In an embodiment, a method for providing a visual representation of search results to a user of an application is provided. The method includes obtaining a natural language query provided by the user via a user interface of the application. The method also includes processing the natural language query to obtain one or more key query terms from the natural language query. The method further includes performing, based on the one or more key query terms, a relevance-ranked search on a plurality of documents to obtain a subset of the plurality of documents relevant to the natural language query. The method further still includes extracting answers to the natural language query from relevant documents among the subset of documents. The method additionally includes obtaining, using document links associated with the relevant documents from which the answers were extracted, graph data including i) nodes representing the relevant documents and entities identified in the relevant documents and ii) edges representing relationships between the relevant documents and the entities identified in the relevant documents. The method further still includes generating, based on the graph data, a graph that includes the relationships between the relevant documents and the entities identified in the documents among the subset of documents. The method additionally includes causing the graph to be displayed via the user interface of the application to enable the user to discover information previously unknown to the user.

In another embodiment, a system is provided. The system includes one or more computer readable storage media and program instructions, stored on the one or more computer readable storage media, that, when executed by at least one processor, cause the at least one processor to perform operations. The operations include obtaining a natural language query provided by a user via a user interface of an application. The operations also include processing the natural language query to obtain one or more key query terms from the natural language query. The operations additionally include performing, based on the one or more key query terms, a relevance-ranked search on a plurality of documents to obtain a subset of the plurality of documents relevant to the natural language query. The operations further include extracting answers to the natural language query from relevant documents among the subset of documents. The operations further still include obtaining, using document links associated with the relevant documents from which the answers were extracted, graph data including i) nodes representing the relevant documents and entities identified in the relevant documents and ii) edges representing relationships between the relevant documents and the entities identified in the relevant documents. The operations additionally include generating, based on the graph data, a graph that includes the relationships between the relevant documents and the entities identified in the documents among the subset of documents. The operations further still include displaying the graph via the user interface of the application to enable the user to discover information previously unknown to the user.

In yet another embodiment, a computer readable storage medium storing computer-executable instructions is provided. The computer-executable instructions, when executed by at least one processor, cause a computer system to perform operations. The operations include obtaining a natural language query provided by a user via a user interface of an application. The operations also include processing the natural language query to obtain one or more key query terms from the natural language query. The operations additionally include performing, based on the one or more key query terms, a relevance-ranked search on a plurality of documents to obtain a subset of the plurality of documents relevant to the natural language query. The operations further include extracting answers to the natural language query from relevant documents among the subset of documents. The operations additionally include obtaining, using document links associated with the relevant documents from which the answers were extracted, graph data including i) nodes representing the relevant documents and entities identified in the relevant documents and ii) edges representing relationships between the relevant documents and the entities identified in the relevant documents. The operations further include generating, based on the graph data, a graph that includes the relationships between the relevant documents and the entities identified in the documents among the subset of documents. The operations further still include causing the graph to be displayed via the user interface of the application to enable the user to discover information previously unknown to the user.

BRIEF DESCRIPTION OF THE DRAWINGS

FIG. 8 is a flowchart for a method for collecting and pre-processing data, according to an embodiment.

FIG. 10 is a flowchart illustrating an example method for providing a visual representation of search results, according to an embodiment.

DETAILED DESCRIPTION

Figure 1:
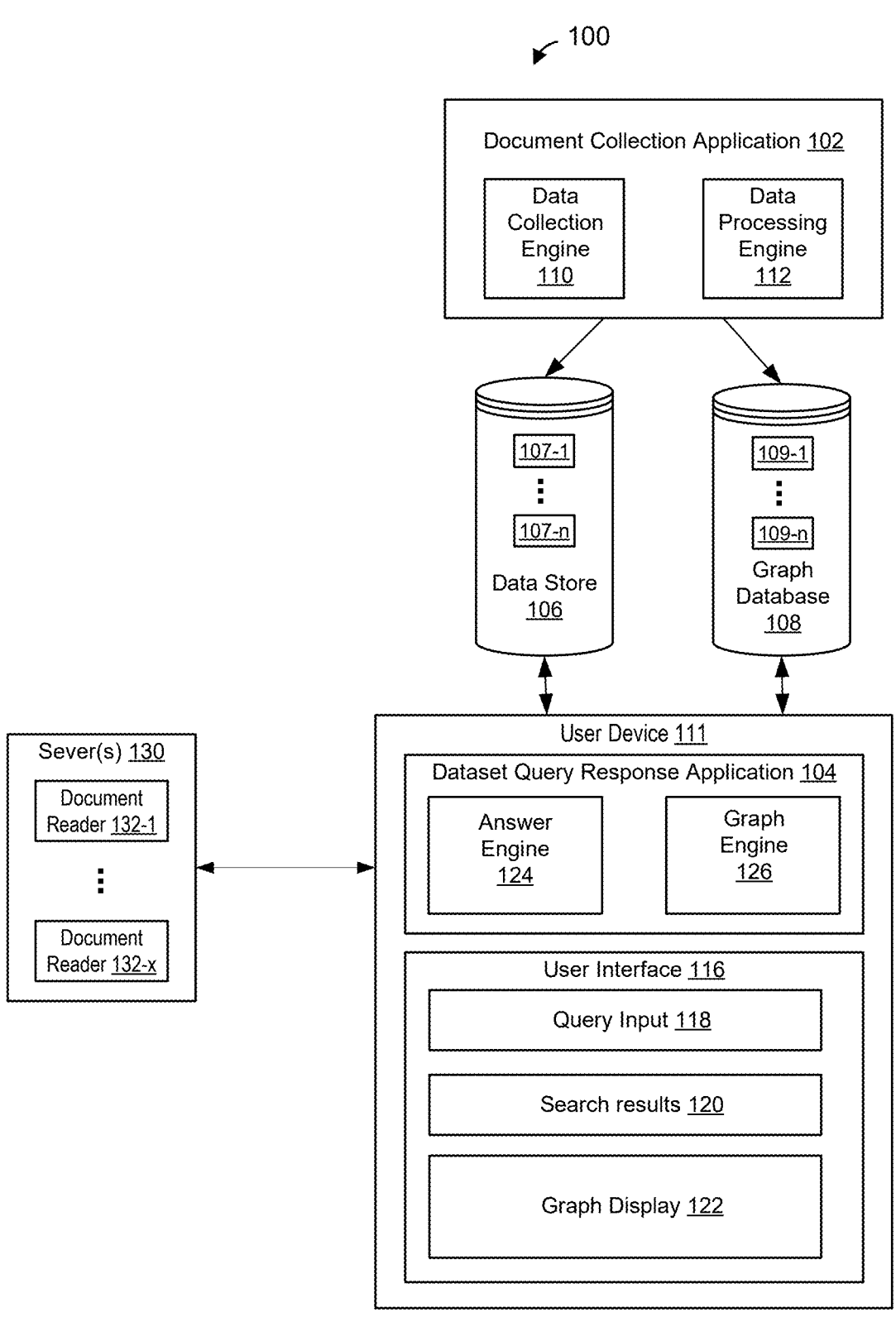
FIG. 1 is a block diagram of a system in which data collection, answer extraction, and data graph techniques may be implemented, according to an embodiment.

In embodiments described below, a dataset query response application allows a user to ask questions and receive answers near real-time as well as obtain a comprehensive report showing data on a particular target or topic of interest for further analysis. The dataset query response application may, for example, allow the user to ask questions related to a dataset that includes a collection of documents containing information of user interest. The collection of documents may include documents obtained from one or more searches (e.g., web searches) that may have been performed to identify information that may be relevant to the search target or topic of interest to the user. In at least some embodiments, the dataset may include a very large collection of documents. For example, the dataset may include millions (e.g., tens or hundreds of millions) of documents downloaded from millions of webpages and/or other sources gleaned, for example, from trillions of searched webpages and/or other sources available on the Internet.

The collection of documents may be pre-processed and stored in a data store. Processing the collection of documents may include vectorizing the documents to generate vector embeddings based on the content of the documents. The vector embeddings may be stored in the data store in association with the documents. Processing the collection of documents may also include identifying entities in the documents, and generating graph data that includes the entities and relationships between the entities identified in the documents. Various processes such as named entity recognition (NER), language-specific NER, multi-lingual NER, regular expression (RegEx) matching, etc. may be used to identify entities in the documents. The graph data may be stored in a graph database in association with identifiers of (e.g., links to) the corresponding documents.

The dataset query response application may enable the user to perform question and answer (QA) sessions in which the user may ask questions about specific information that may be contained in the collection of documents. The dataset query response application may obtain a natural language query that may be provided by the user, and may process the natural language query to obtain key query terms from the natural language query. Based on the key query terms obtained from the natural language query, the dataset query response application may identify a subset of documents, among the documents contained in the dataset stored in the data store, that may be relevant to the query. For example, the dataset query response application may perform a relevance-ranked search on the dataset based on the key query terms obtained from the natural language query to identify the subset of documents relevant to the query. The dataset query response application may further process the subset of documents to identify relatively more relevant documents (sometimes referred to herein as simply "relevant documents"), among the subset of documents, that may contain information responsive to the query, and may extract answers to the query from the relevant documents. Processing the subset of documents and extracting the answers from the relevant documents may be performed using one or more models, such as language-specific natural language processing (NPL) models, LLMs (e.g., transformer models), etc. In an embodiment, a chat extractive pre-trained transformer may be used to process the subset of documents and to extract answers from the relevant documents.

The dataset query response application may display the answers, along with excerpts from the documents from which the answers were extracted, to the user. The excerpts may provide context windows from which the user may learn context of the extracted answers and/or glean additional information that may appear in context windows corresponding to the excerpts of documents displayed to the user. In embodiments, the dataset query response application may allow the user to further explore the information in the relevant documents via a graph generated from graph data based on the content of the documents. The graph data may be obtained by the query response application from the graph database based on indicators associated with the relevant documents that served as the basis for the answers displayed to the user. The graph may include nodes that correspond to the relevant documents and to the entities identified with the documents, and edges illustrating relationships and connections between the documents and the entities identified across the documents. Accordingly, the graph may provide a visual representation of useful information contained in the relevant documents and connections between entities across the relevant documents. The dataset query response application may thus integrate answer extraction with graph data to allow users to see the answers extracted from the relevant documents and to visualize other information that may be contained in the relevant documents outside of the context windows that served as the basis for the answers extracted from the documents. In these ways, the user may be able to see other information that may be contained in the relevant documents that served as the basis for the extracted answers, such as entities that may be mentioned in the document outside of the context window corresponding to the excerpt that is displayed to the user along with the extracted answer. The user may thus be able to discover additional information, such as "know-unknow" information and/or "unknown-unknow" information, which was previously not known to the user.

Processing the subset of documents to identify the relevant document and extracting the answers from the relevant documents may narrow down the dataset, which may contain hundreds of millions of documents, to a fewer number of documents (e.g., thousands or tens of thousands of documents) that are more relevant to the user's query. Exploring the relevant documents via the graph data may further narrow down the relevant documents to include only the documents that are highly relevant to the exploration performed by the user. As an example, the most relevant documents may include a few hundred of relevant documents from the original dataset. In an embodiment, highly relevant documents (e.g., the subset of documents identified based on the natural language query, the relevant documents from which the answers to the natural language query were extracted, and/or a set of relevant documents further reduced by exploration via graph data) may be further leveraged to generate useful models trained for topics related to the documents. For example, such relevant documents may be used to train a generative LLM (e.g., a chat generative pre-trained transformer) to generate a generative LLM that is highly focused on the topic. The user may then be able to engage in a conversation (e.g., QA session) with the highly focused generative LLM to obtain answers to topic-related questions that may be of interest to the user. Because the generative LLM is trained on only the highly relevant documents, the LLM may be focused in a relatively small context window (small amount of memory) that the LLM can use to generate answers to the queries obtained from the user. The generative LLM may thus provide highly accurate and relevant answers to topic-specific questions from the user, in at least some embodiments.

As described above, documents stored in the dataset in the data store may be obtained from one or more searches (e.g., web searches) that may be performed to identify information that may be relevant to a search target or topic of interest to the user. In some cases, multiple parallel and/or partially overlapping sources and tools for searching and obtaining such information are available. These sources may have different levels of exposure and access to different networked data sources, such as the world wide web, dark web, deep web (paywalled, blocked web crawlers from private databases), government databases, social media sources, security credential protected, and/or other data sources. Thus, when performing such investigations, it is impractical for individuals and entities to query even a plurality of the information tools available to support the investigation.

Various ones of the techniques and architectures discussed below provide a system that uses an unattributed search algorithm that allows for iterative and/or multi-session search queries that may be applied to multiple different search tools via search agent routines. The use of a multi-session search algorithm allows information obtained in initial search sessions and/or iterations to improve the accuracy, efficacy, and efficiency of search functionality of the underlying hardware systems. The iterative and/or unattributed search techniques and architectures discussed herein may be used for large scale network-based search tool access, data collection, processing, enrichment, AI/ML entity and relationship extraction, search, chatbots, and/or graph database generation.

Additionally, or alternatively, a user may desire to perform such an investigation while remaining anonymous. For example, a company may wish to perform the initial stages of an executive officer search without alerting potential candidates of the company's interest and/or without the company's interest being tracked by the other webservers. Because of various monitoring tools (such as social media add-on services, monitoring bots, and other monitoring systems), a target of a background investigation may be alerted when their profile is viewed, a particular website is visited, and/or when other investigative actions occur. Furthermore, the webserver may be able to correlate the company's search viewings. Thus, the pattern of search and access touchpoints created when performing such an investigation may create a traceable or otherwise decipherable record that may allow the target, through technical monitoring means, to identify the searcher, be appraised that an investigation is occurring, and/or identify the purpose or intent behind the searches.

Various ones of the techniques and architectures discussed below provide a system that uses a search algorithm that allows for multi-session search queries that may be applied to multiple different search tools via search agent routines. The use of search agent routines allows for distribution and dissociation of various elements of the search. Because the various search agent routines may execute on different hardware, the search agent routines may be geographically and/or logically separated. The various search agent routines may be thus provided and/or passively present with different identifiers providing the appearance of disparate searches, preventing external observers from discerning any particular search pattern. Thus, individual searches may be detected, but the search agent routines may prevent the occurrence of external indications that systemic data search and/or collection is ongoing. Thus, the techniques and architectures described herein solve the technical problem of search obfuscation via the technical solution of distributed search agent routines.

As discussed above, in various contexts, a user may desire to probe such multi-session search results or other comprehensive dataset contents using conversational and/or other natural language queries. Unlike other neural network models, transformers provide deeper contextual relationships across the parameters enabling better results from machine learning processes. The transformers is a trained software model that is tuned and tailored for use cases that allows the connections and terms to be interconnected across matrices of parameters/decision points to enable the prediction of language processing. However, conventional systems relying on generative chat artificial intelligence systems, such as chatGPT (GPT-Generative Pre-trained Transformer), are known to, in some cases, produce responses with the appearance of credibility and validity but inaccurate, incomplete, and/or falsified (including, in some cases, falsified sources) in actuality. Thus, in some cases, it may be undesirable to rely on generative chat artificial intelligence responses for accurate and/or reliable information. Nevertheless, such generative chat artificial intelligence systems may increase user experience and/or satisfaction with search systems by better approximating human-to-human interaction. Thus, generative chat artificial intelligence systems may be optionally and readily combined with the techniques and architectures discussed herein. For example, generative chat artificial intelligence systems may be used to provide an interactive "frontend" to a second "backend" investigative artificial intelligence. A frontend may include user interface elements that may control the non-substantive presentation and/or interaction of the user with the collected data. A backend may include processing and/or operational elements charged with substantive analysis and generation of query responses. The backend investigative artificial intelligence may provide the factual content that is then delivered to the operator by the frontend generative chat artificial intelligence system. Thus, in this illustrative example, generative artificial intelligence may be constrained to operate to aid user-navigation of substantive results produced by non-generative artificial intelligence (such as an extractive transformer as discussed below). Other configurations may be used.

Various ones of the techniques and architectures discussed below provide a system that uses an extractive engine (e.g., an extractive transformer or other extractive neural network) that is pre-trained to provide referenced responses to natural language queries that may be obtained from a user. Unlike generative chat artificial intelligence systems, an extractive model is barred from synthesizing chat and/or other data responses. Instead, the extractive model extracts data from in-dataset sources. Thus, all responses by the extractive model are technologically bound to have grounding within the dataset being probed via the natural language query.

The various ones of the techniques and architectures discussed below also implement extractive models that provide sourcing indicators showing the origin of the excerpt within the dataset. Accordingly, various ones of the techniques and architectures discussed below implement an extractive model that answers a query by providing a responsive excerpt from within an existing dataset and provides explicit sourcing for that excerpt. Thus, the techniques and architectures discussed below solve the technical problem of inaccurate synthesized AI responses by implementing an extractive model that provides excerpted and/or explicitly sourced responses.

FIG. 1 is a block diagram of a document collection, answer extraction, and graph data display system 100 in which data collection, answer extraction, and data graph techniques described herein may be implemented, in accordance with embodiments of the present disclosure. The system 100 may include a data collection application 102, a dataset query response application 104, a data store 106, and a graph database 108. The data collection application 102 and/or the dataset query response application 104 may be at least partially executed on a user device 111. Examples of a user device 111 include, but are not limited to, a desktop computer, laptop, tablet, and smart phone. In another embodiment, the data collection application 102 and the dataset query response application 104 may be executed by different user devices. Further, in some embodiments, the data collection application 102 and the dataset query response application 104 may be combined as a single end-to-end application that may be at least partially executed on the user device 111. In some embodiments, the system 100 may also include one or more servers 130. The user device 111 may be coupled to the server(s) 130 over a network (e.g., the Internet).

The data collection application 102 may include a data collection engine 110 and a data pre-processing engine 112. The data collection engine 110 may be configured to perform a search based on an input obtained from a user. The search may be directed to a topic of interest or a search target specified by the user. For example, as described in more detail below, the data collection engine 110 may be configured to obtain seed terms that may define, or be otherwise related to, the topic of interest or search target of the user. The seed terms may include information related to notable fields such as a name, address, email address, tax IDs, etc., that may be provided by the user. The data collection engine 110 may transform the seed terms into search terms and may apply the search terms to one or several search engines to identify web pages and/or other sources (e.g., on the Internet) that may contain information relevant to the topic or search target of interest to the user. The data collection engine 110 may download data from the identified web pages and/or other sources and thus generate a dataset that may include documents and/or other informational objects containing information obtained from the search. In other examples, the data collection engine 110 may be configured to obtain data of potential interest to the user in other suitable manners. As described in more detail below, in some embodiments, the data collection engine 110 may be configured to perform unattributed searches so that the data may be obtained in a manner that ensures anonymity of the user.

The documents and/or other informational objects obtained by the data collection engine 110 may be stored, in some form, in a dataset 107 in the data store 106. In an embodiment, the data store 106 may store a plurality of separate datasets 107. Each dataset 107 may include documents obtained in a particular search on a particular topic of interest to the user. For ease of explanation, documents and/or other informational objects containing information obtained from a search are collectedly referred to herein as simply "documents". It is thus noted that the terms "document" or "documents" as used herein may refer to informational objects other than documents. Further, although the description herein generally relates to documents obtained from a search, it is noted that the documents in a dataset 107 may include documents that are obtained in suitable manners other than a search. In general, a dataset 107 may include any collection of documents that may, for example, be related to a topic of interest to a user. In at least some embodiments, a particular dataset 107 may include a very large collection of documents. For example, the dataset 107 may include millions (e.g., tens or hundreds of millions) of documents downloaded from millions of webpages and/or other sources gleaned from trillions of searched webpages and/or other sources available on the Internet, for example.

The data pre-processing engine 112 may be configured to process the collection of documents to prepare the documents and/or related information for storage in the data store 106 and the graph database 108. In an embodiment, processing of the documents may include vectorizing content of the documents to generate vector embeddings based on the content of the documents. The vector embeddings may be stored in a dataset 107 along with the raw content of the documents. Processing the collection of documents may also include identifying entities in the documents, and generating graph data 109 including the entities and relationships between the entities that are identified in the documents. The data pre-processing engine 112 may be configured to implement various processes such as NER, language-specific NER, multi-lingual NER, RegEx matching, etc. to identify the entities and relationships in the documents. The graph data 109 generated based on the documents contained in the dataset 107 may be stored in the graph database 108 in association with identifiers of (e.g., links to) the corresponding documents.

The graph database 108 may store a plurality of sets of graph data 109, each set of graph data 109 including graph data generated based on documents of a particular dataset 107, in an embodiment. The various processes that may be implemented by the data pre-processing engine 112 to process the collection of documents to prepare the documents and/or related information for storage in the data store 106 and in the graph database 108, according to various embodiments, are described in more detail below in connection with FIGS. 7, 8, 13A and 13B, for example.

The dataset query response application 104 may allow the user to explore information contained in one or more datasets 107 stored in the data store 106 and corresponding sets of graph data 109 stored in graph database 108. In an embodiment, the dataset query response application 104 may include or otherwise provide a graphical user interface 116 that may, in turn, include a query input field 118, a search results display 120, and a graph display 122. The dataset query response application 104 may be configured to obtain a query from a user via the query input field 118. For example, the user may enter a natural language query into the query input field 118. The natural language query may be for exploring information contained in a dataset 107 that may be stored in the data store 106. For example, the natural language query may ask a question relating to information that may be contained in a dataset 107 in the data store 106. In an example, the natural language query may be directed to a particular dataset 107 among a plurality of datasets 107 that may be stored in the data store 106. As described in more detail below, the graphical user interface 116 may allow the user to select or otherwise indicate a particular dataset 107 that the user wishes to explore. As also described in more detail below, in at least some embodiments, the natural language query may be entered in a particular language among a plurality of languages that may be supported by the dataset query response application 104. For example, the graphical user interface 116 may allow the user to select a particular language for the natural language query form among a plurality of languages supported by the dataset query response application 104.

The dataset query response application 104 may also include an answer engine 124 and a graph engine 126. The answer engine 124 may be configured to process the natural language query to extract key query terms from the natural language query. For example, the answer engine 124 may process the natural language query using a natural language processing model, such as a neural network model, a transformer model, an LLM model, etc., that is trained in the language of the natural language query. The answer engine 124 may use the one or more key query terms to search the dataset 107 to obtain a subset of documents that may contain or otherwise convey information relevant to the natural language query. For example, the answer engine 124 may perform a relevance-ranked search on a plurality of documents of the dataset 107 to obtain the subset of the plurality of documents relevant to the natural language query.

The answer engine 124 may further analyze the subset of documents to extract information that answers the natural language query from relatively more relevant documents, among the subset of documents, that may include information relevant to the natural language query. In an embodiment, the answer engine 124 may employ one or more (e.g., a plurality of) readers 132 to process the plurality of documents. The one or more readers 132 may be executing or otherwise running on the one or more servers 130, for example. The one or more readers 132 may parse the documents and identity various key terms, such as entities, that may be mentioned in the documents. The one or more readers 132 may return processed documents in which various portions may be labeled, for example. The answer engine 124 may use the documents received from the one or more readers 132 to identify the relevant document that contain information that may be responsive to the natural language query. For example, the answer engine 124 may identify portions of documents, among the subset of documents, that contain information that answers the natural language query. The answer engine 124 may also extract answers from the identified portions of documents that contain information that answers the natural language query. The answer engine 124 may assign or otherwise generate relevance scores for the answers extracted from the documents. The relevance scores may indicate, for example, relevance of the respective answers to the natural language query and/or confidence that the respective answers actually answer the natural language query.

In an embodiment, the answer engine 124 may include one or more models 114, such as neural networks, that may be trained or otherwise configured to process natural language queries obtained from the user and extract answers to the natural language queries obtained from the user. For example, the answer engine 124 may include one or more language-specific NPL models, LLMs (e.g., transformer models), etc. In an embodiment, the answer engine 124 may include or execute a pre-trained extractive transformer model to process the subset of documents and to extract answers from the relevant documents. In an example, each of the one or more models may be trained in a particular language among a plurality of languages that are supported by the dataset query response application 104. The answer engine 124 may thus be configured to select an appropriate model based on the language of the natural language query. The one or more models may include transformer models trained to process natural language queries and to extract answers from documents that are responsive to the natural language queries. In various examples, each of the one or more models may comprise a bidirectional encoder representations from transformer (BERT) model. In some embodiments, each of the one or more models may comprise an optimized or enhanced BERT model, such as robustly optimized bidirectional encoder representations from transformers (BERT) pre-training approach (ROBERTa) model or decoding enhanced BERT (DeBERTa) model. In other examples, other suitable pre-trained models may be utilized.

The dataset query response application 104 may be configured to display the answers extracted by the answer engine 124 to the user in the search results display 120 of the graphical user interface 116. As described in more detail below, the answers in the search results display 120 may be displayed along with identifiers of (e.g., link to) the sources of the documents, the relevance scores associated with the answers extracted from the documents, and excerpts from the documents that provided basis for the answers. The excerpts may provide a context window including information surrounding the answers, in the documents from which the answers were extracted, to the user, in an embodiment. Example graphical user interfaces for obtaining a natural language query and example search results displays provided to display the extracted answers by the answer engine 124, according to embodiments, are described in more detail below in connection with FIGS. 2, 7, 8, 13A and 13B, for example.

In some situations, the user may wish to further explore information in the documents from which the answers were extracted. For example, the user may wish to view information from the documents that is outside of the context windows corresponding to the excerpts from the documents that may be displayed along with the answers in the search results display 120 to the user. In various embodiments, the dataset query response application 104 may be configured to allow the user to explore the information further by providing a graph generated based on the content of the relevant documents. For example, the graph engine 126 of the dataset query response application 104 may be configured to generate a graph based on information identified in the documents that served as basis for the answers to enable the user to further explore the information in these documents. In an embodiment, the graph engine 126 may query the graph database 108 based on indicators (e.g., links) associated with the documents from which the answers were extracted. The graph engine 126 may thus obtain, from the graph database 108, graph data that may include entities that were identified in the documents from which the answers were extracted by the answer engine 124 and relationships between the documents and the entities identified in the documents from which the answers were extracted by the answer engine 124. The dataset query response application 104 may generate a graph based on the graph data obtained from the graph database 108, and may display the graph to the user in the graph display 122. The graph may illustrate nodes and edges between the nodes, where the nodes may correspond to the documents and entities identified in the documents, and the edges may correspond to the relationships between the documents and the entities identified in the documents. The graph data included in the graph may be filtered based on settings that may be obtained from the user, such that highly relevant documents and entities may be effectively displayed to the user. Example advanced graph user setting interfaces and example graphs that may be provided to the user, according to embodiments, are described in more detail below with reference to FIGS. 3-6, for example.

In some embodiments, the dataset query response application 104 may allow the user to click on, or otherwise engage with, the nodes and/or the connections displayed in the graph display 122 to enable the user to view further information that may be of interest to the user. For example, the dataset query response application 104 may allow the user to click on, or otherwise engage with, nodes in the displayed graph to expand the nodes to show additional entities connected to the nodes. For example, in response to detecting a user's click on or other engagement with a particular node on the displayed graph, the dataset query response application 104 may display further nodes that are connected to the particular node on the graph. As another example, in response to detecting a user's click on or other engagement with a particular node that corresponds to a document represented by the node on the displayed graph, the dataset query response application 104 may display the actual source document to the user, or may redirect the user to the linked source document, e.g., on the Internet.

The graph generated by the graph engine 126 may provide a visual representation of useful information contained in the relevant documents and connections between entities identified across the relevant documents. The dataset query response application 104 may thus integrate answer extraction with graph data to allow users to see the answers extracted from the relevant documents and to visualize other information that may be contained in the relevant documents outside of the context windows that served as the basis for the answers extracted from the documents. In these ways, the user may be able to see other information that may be contained in the relevant documents that served as the basis for extracted answers, such as entities that may be mentioned in the document outside the context windows corresponding to the excerpts that are displayed to the user along with the answers extracted from the documents. The user may thus be able to discover additional information, such as "know-unknow" information and/or "unknown-unknow" information, that was previously not known to the user.

Processing the subset of documents to identify more relevant document and extracting the answers from the relevant documents may narrow down the dataset, which may contain hundreds of millions of documents, to a fewer number of documents (e.g., thousands or tens of thousands of documents) that are more relevant to the user's query. Exploring the relevant documents via the graph data may further narrow down the relevant documents to include only the documents that are highly relevant to the exploration performed by the user. As an example, the most relevant documents may include a few hundred of relevant documents from the original dataset. In an embodiment, highly relevant documents (e.g., the relevant documents identified based on the natural language query, the relevant documents from which the answers to the natural language query were extracted, and/or a set of relevant documents further reduced by exploration via graph data) may be further leveraged, for example to generate useful models trained for topics related to the documents. For example, such highly relevant documents may be used to train a generative LLM (e.g., a chat generative pre-trained transformer) to generate a generative LLM that is highly focused on the topic. The user may then be able to engage in a conversation (e.g., QA session) with the highly focused model to obtain answers to topic-related questions that may be of interest to the user. Because the LLM is trained on only the highly relevant documents, the LLM may be focused in a relatively small context window (small amount of memory) that the LLM can use to generate answers to the queries obtained from the user. The generative LLM may thus provide highly accurate and relevant answers to topic-specific questions from the user, in at least some embodiments.

Figure 2:
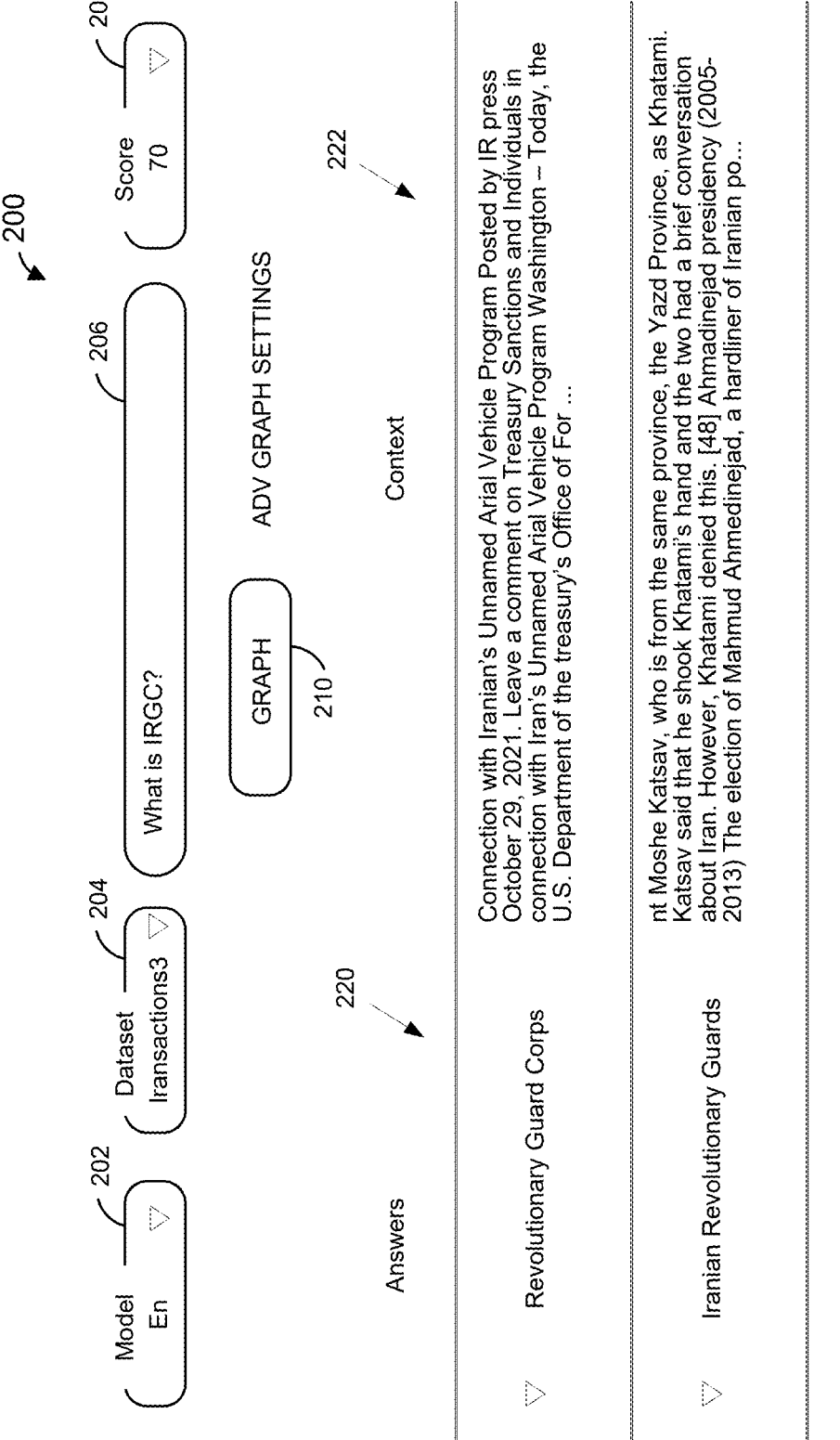
FIG. 2 is a diagram of an example question and answer graphical user interface of a dataset query response application, according to an embodiment.

FIG. 2 is a diagram of an example question and answer graphical user interface 200 of a dataset query response application, according to an embodiment. In an embodiment, the question and answer graphical user interface 200 corresponds to the graphical user interface 116 of the dataset query response application 104 of the system 100 of FIG. 1. In another embodiment, the question and answer graphical user interface 200 may be provided by a dataset query response application different from the dataset query response application 104 of FIG. 1 and/or used in a system different from the system 100 of FIG. 1. For ease of explanation, the question and answer graphical user interface 200 is described below with reference to FIG. 1.

The question and answer graphical user interface 200 is configured to enable a user to enter a natural query for exploring information that may be contained in a dataset, and to display search results to the user. The question and answer graphical user interface 200 may include a language model selection box 202, a dataset selection box 204, a query input field 206, a score box 208, a search results field 210, and an advance graph settings button 212. In other embodiments, one or more other suitable boxes, fields, buttons etc. may be included in the question and answer graphical user interface 200 in addition to or instead of one or more of the language model selection box 202, the dataset selection box 204, the query input field 206, the score box 208, the search results field 210, and/or the advance graph settings button 212.

The language model selection box 202 may allow the user to select a language in which the user wishes to enter the query. For example, the language model selection box 202 may be configured to provide a drop-down menu listing multiple languages that are supported by the dataset query response application 104. As just an example, the multiple languages may include English, French, German, Russian, Chinese, Turkish, Urdu, Arabic, and/or other language of interest. The drop-down menu may thus limit possible selections to only the languages that are supported by the dataset query response application 104. In other examples, the user may select or otherwise specify the language in other suitable manners. In some examples, the dataset query response application 104 may be configured to detect the language of the query without the user explicitly selecting or otherwise specifying the language of the query. In some such examples, the question and answer graphical user interface 200 may omit the language model selection box 202. In an embodiment in which the dataset query response application 104 is configured to detect the language of the query, if the dataset query response application 104 cannot recognize the language of the query and/or if the language of the query is not supported by the dataset query response application 104, the dataset query response application 104 may inform the user that the language is not recognized or is not supported. For example, the dataset query response application 104 may display an error message and/or display a list of supported languages to the user in the question and answer graphical user interface 200. The user may then enter the natural language query in a language that is supported by the dataset query response application 104.

The dataset selection box 204 may allow the user to select a dataset that the user wishes to explore. The dataset selection box 204 may be configured to provide a drop-down menu that lists the available datasets, such as available datasets 107 that may be stored in the data store 106. The user may select the database from the drop-down menu, for example by clicking on a dataset name in the drop-down menu. In other examples, the user may select or otherwise specify the dataset in other suitable manners. The query input field 206 may allow the user to enter the natural language query. The user may enter the natural language query in the language selected or otherwise specified in the language model selection box 202, for example. The score box 208 may be configured to enable a user to select or otherwise specify relevance score for the search results that the user wishes to see. For example, the user may select or otherwise specify a minimum relevance score of interest to the user.

The dataset query response application 104 may process the natural language query, entered by the user via the query input field 206, using a model (e.g., an NLP model) that is trained in the language of the natural language query. Processing the natural language query may include obtaining one or more key query terms from the natural language query. The dataset query response application 104 may be further configured to perform a search on the dataset 107 selected or otherwise specified by the user, to obtain a subset of documents that may include information responsive to the query. For example, the dataset query response application 104 may be configured to perform a relevance-ranked search based on the one or more key query terms obtained from the natural language query. The subset of documents obtained from the dataset 107 may be further processed to identify relevant documents that contain answers to the natural language query. For example, the dataset query response application 104 may employ a plurality of readers, such as the document readers 132, to process the subset of documents, to identify relevant documents that include information that may answer the natural language query, and to extract answers to the natural language query from the relevant documents. The dataset query response application 104 may be configured to assign relevance scores to the answers extracted from the relevant documents. The relevance scores may indicate, for example, the likelihood that the extracted answers answer the natural language query.

The dataset query response application 104 may be configured to display the extracted answers to the user in the search results field 210 of the question and answer graphical user interface 200. The extracted answers may be presented to the user along with corresponding contexts, or excerpts, from the documents from which the answers were extracted by the dataset query response application 104. In an embodiment, the search results field 210 may comprise a table for displaying the search results to the user. The table may include an answer column 220 configured to display the extracted answers and a context column 222 configured to display the corresponding context or excerpt to the user. The context may provide a context window from which the user may be able to glean additional information that may be of interest to the user. In an embodiment, the dataset query response application 104 may be configured to limit the extracted answers shown to the user to only the answers associated with relevance scores that exceed the relevance score specified by the user in the score box 208. The contexts or excepts displayed to the user in the search results display 120 may provide some context and additional information that may be of interest to the user. However, the context windows may be relatively small. For example, only one or several relevant sentences from a document may be displayed to the user.

In the example illustrated in FIG. 2, the user wishes to explore information contained in a dataset named "Transactions3". For this purpose, the user wishes to provide a natural language query in the English language. Accordingly, the user selects or otherwise specifies "English" in the language model selection box 202 and selects or otherwise specifies "Transactions3" as the dataset of interest in the dataset selection box 204. In an example, the dataset "Transactions3" may correspond to a particular dataset 107 stored in the data store 106. The dataset "Transactions3" may be a dataset generated, for example, based on a search related to sections in Iran that was performed based on seed terms provided by the user. The user also enters the natural language query into the query input field 206. In the illustrated example, the natural language query is "What is IRGC?", where IRGC is an abbreviation for Islamic Revolutionary Guard Corps, which is a branch of Iranian armed forces. The user further indicates a minimum relevance score of "70" in the score box 208. Based on the user input, the dataset query response application 104 may identify documents relevant to the natural language query, and extract answers that are responsive to the natural language query. In the illustrated example, the answers include "Revolutionary Guard Corps" and "Iranian Revolutionary Guards." The answers may further include other answers that may be extracted from the relevant documents. As illustrated in FIG. 2, the answers may be displayed in the search results display 120 along with the contexts or excerpts from the documents.

In an embodiment, the dataset query response application 104 may be configured to allow the user to further engage with the information that may be contained in the relevant documents, by providing the user with a graph display of entities and relationships identified in the relevant documents. The dataset query response application 104 may allow the user to provide various settings for filtering the graph data so that the user may more easily see and discover information that may be of interest to the user. For example, the graph button 212 of the question and answer graphical user interface 200 may allow the user to access the settings for display of graph data to the user.

Figure 3:
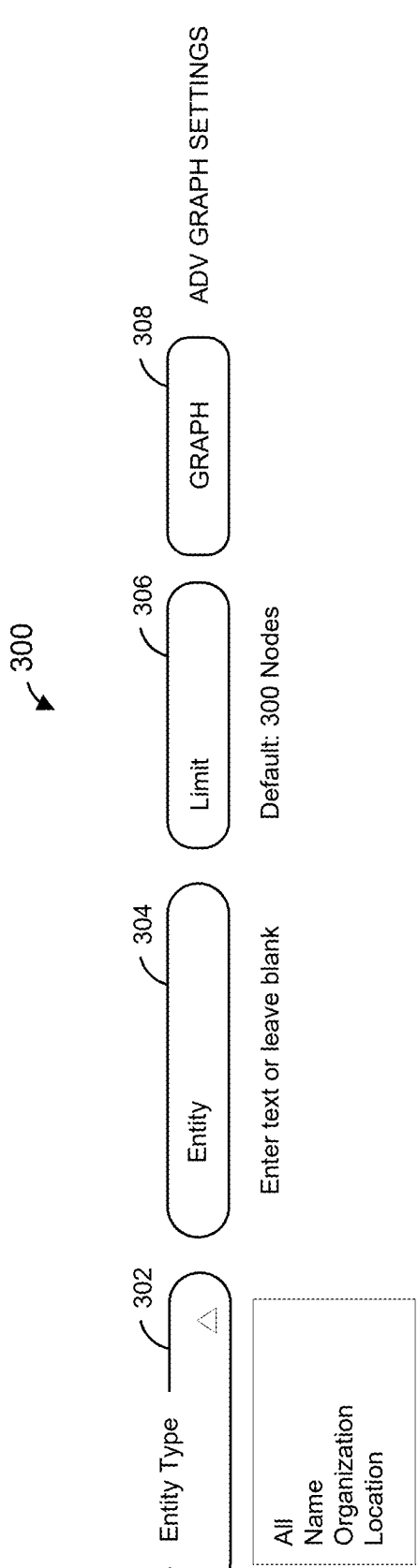
FIG. 3 is a diagram of an advanced graph settings user interface that may allow the user to filter the graph data to be displayed, according to embodiment.

In response to detecting that the user has clicked on or otherwise engaged with the graph button 212, the dataset query response application 104 may provide an advanced graph settings interface to the user. FIG. 3 is a diagram of an advanced graph settings user interface 300 that may allow the user to filter the graph data to be displayed, according to an embodiment. For example, the advanced graph settings user interface 300 may allow the user to specify settings for filtering the graph data such that only entities of a certain type and/or entities that include certain key terms are displayed to the user. As illustrated in FIG. 3, the advanced graph settings user interface 300 may include an entity type box 302, an entity field 304, a limit field 306, and a graph button 308. In other embodiments, one or more other suitable boxes, fields, buttons etc. may be included in the advanced graph settings user interface 300 in addition to or instead of one or more of the entity type box 302, the entity field 304, the limit field 306, and/or the graph button 308.

The entity type box 302 may allow the user to enter a type of entity of interest to the user. In an embodiment, the entity type box 302 may be configured to provide a drop-down menu listing multiple types of entities that are available for selection by the user. As just an example, the types of entities that are available for selection by the user may include "name", "organization", "location", and/or another suitable type of entity. The entity type box 302 may be configured to allow the user to select or otherwise specify a particular type of entity, or to specify that the user is interested in seeing all entity types. The entity field 304 may allow the user to enter one or more graph search terms that may specify, for example, a particular entity, such as a particular name, a particular organization, a particular location, etc. that the user wishes to see in the data graph. The limit field 306 may allow the user to enter a maximum number of nodes to be displayed in the graph. The dataset query response application 104 may be configured to use user selections when generating a graph based on graph data obtained from the graph database 108 or otherwise generated by the dataset query response application 104. For example, the dataset query response application 104 may generate the graph to display only entities of the type specified by the user via the entity type box 302 and/or only entities that contain the particular entity specified by the user via the entity field 304. The dataset query response application 104 may also be configured to limit the number of nodes shown in the graph to the maximum number of nodes specified by the user via the limit field 306.

The graph button 308 may allow the user to initiate the generation and display of the graph by the dataset query response application 104. In response to detecting that the user has clicked on or otherwise engaged with the graph button 308, the dataset query response application 104 may generate and display the graph to the user. In an embodiment, the dataset query response application 104 is configured to use user selections when generating a graph if the user enters or otherwise specifies selections in one or more of the entity type box 302, the entity field 304, and the limit field 306. However, such selections may be optional. The dataset query response application 104 may be configured to display all entities and/or use default settings if corresponding selections are not provided by the user, in an embodiment. Example settings provided by the user and example graph displays that may be generated and displayed to the user, according to an embodiment, are described in more detail below with reference to FIGS. 4-6, for example.

Figure 4:
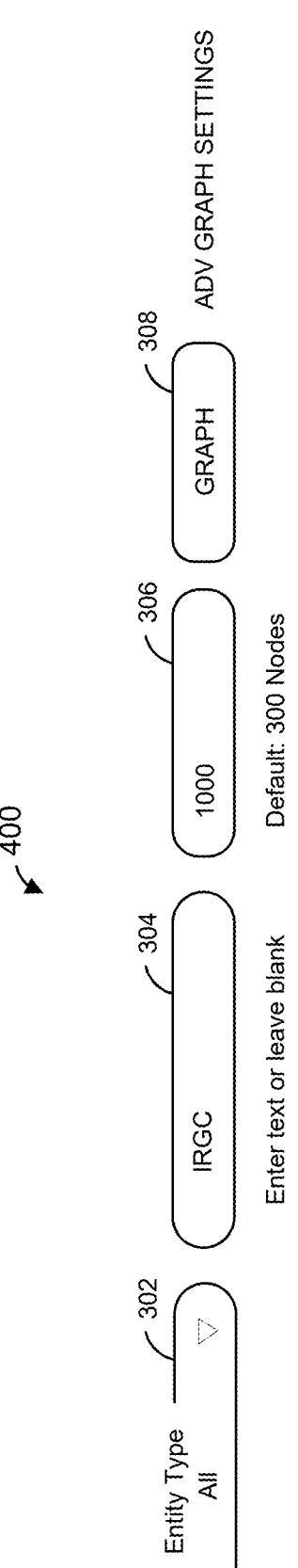
FIG. 4 illustrates example advanced graph settings provided by a user, according to an embodiment.

FIG. 4 illustrates example advanced graph settings 400 provided by a user, according to an embodiment. The settings 400 may be selected or otherwise entered or specified by the user via the advanced graph settings user interface 300, as illustrated in FIG. 4, or may be provided by the user in other suitable manners. As illustrated in FIG. 4, the user has specified via the entity type box 302 that all entity types should be displayed in the graph. Further, the user has entered "IRGC" into the entity field 304 to indicate that the user is interested in seeing entities that contain "IRGC" in the graph. The user has also entered "1000" into the limit box 306 to indicate that the graph should be limited to 1000 nodes.

Figure 5:
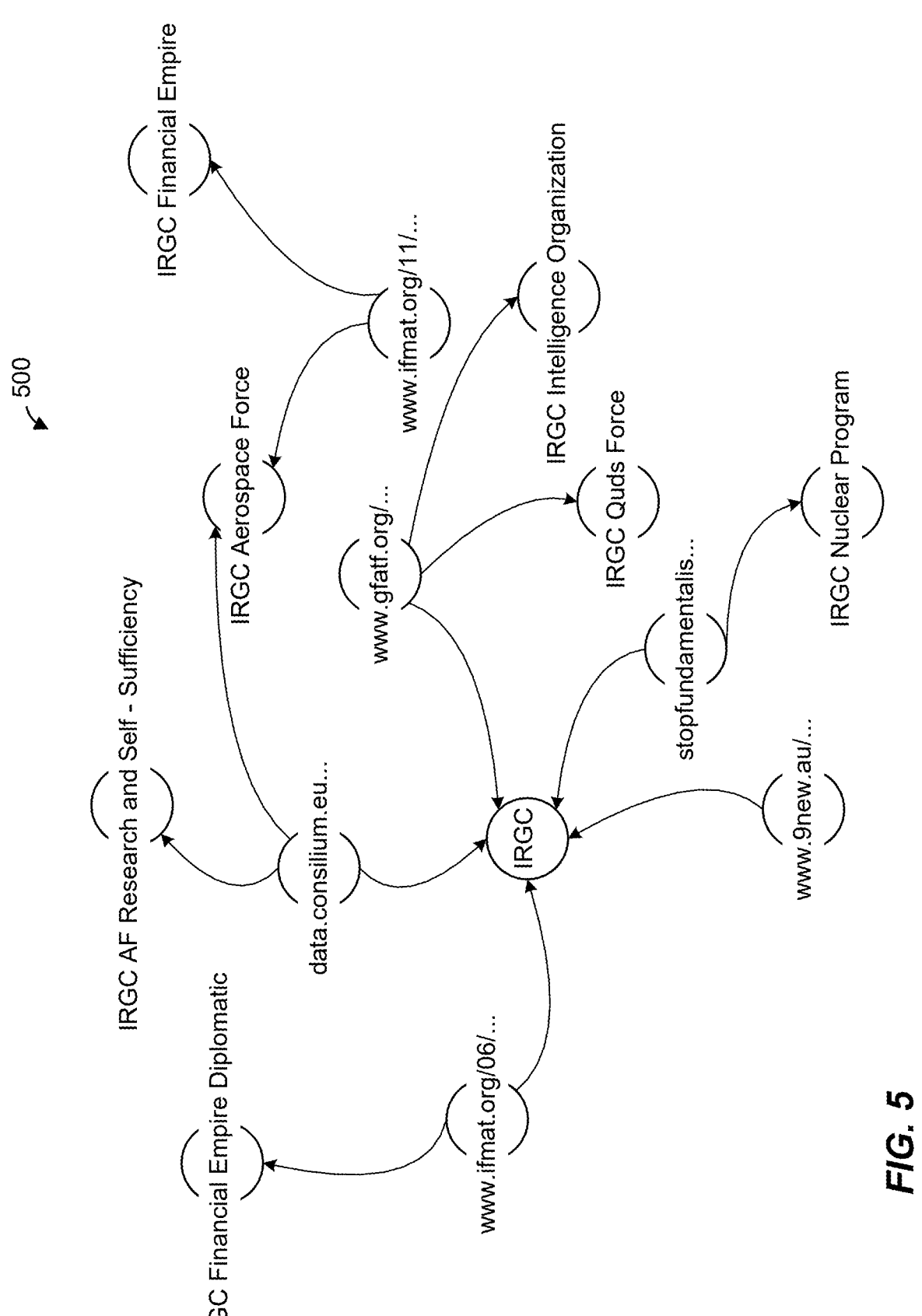
FIG. 5 illustrates an example graph generated by the dataset query response application based on the settings of FIG. 4, according to an embodiment.

FIG. 5 is an example graph 500 generated by the dataset query response application 104 based on the settings 400 of FIG. 4, according to an embodiment. The data graph 500 is generated based on graph data that includes entities identified in the relevant documents from which the answers displayed in the answer column 220 of the question and answer graphical user display 200 of FIG. 2 were extracted, in an embodiment. The dataset query response application 104 may be configured to obtain the graph data for the graph 500 from the graph database 108 based on identifiers (e.g., links) associated with the relevant documents that served as the basis for the answers displayed to the user. In other embodiments, the dataset query response application 104 may obtain or generate the graph data for the graph 500 in other suitable manners.

The graph 500 includes nodes (represented by circles in FIG. 5) that correspond to the documents and to the entities identified in the documents. The graph 500 also includes relationships (represented by arrows in FIG. 5) showing connections between the documents and the entities identified in the documents. The nodes corresponding to the documents may be visually distinguished from the nodes corresponding to the entities identified in the documents. For example, different colors may be used to visually distinguish the nodes corresponding to the documents from the nodes corresponding to the entities identified in the documents. The nodes corresponding to the documents may be marked with the links associated with the documents. The relationships may connect, for example, nodes corresponding to entities with nodes corresponding to documents in which the entities were found.

The dataset query response application 104 may also be configured to filter the graph data based on the settings provided by the user. Thus, in the illustrated example, the dataset query response application 104 may filter the graph data to retain only entities that include "IRGC" as specified by the user. The graph 500 thus only shows entity nodes that include "IRGC", in the illustrated embodiment. The dataset query response application 104 may also limit the number of nodes in the graph 500 to one thousand nodes as specified by the user. For example, the dataset query response application 104 may display a maximum of one thousand nodes that are associated with relatively higher relevance or confidence scores. In other examples, the dataset query response application 104 may select the nodes to be included in the graph 500 according to other suitable selection criteria.

Figure 6:
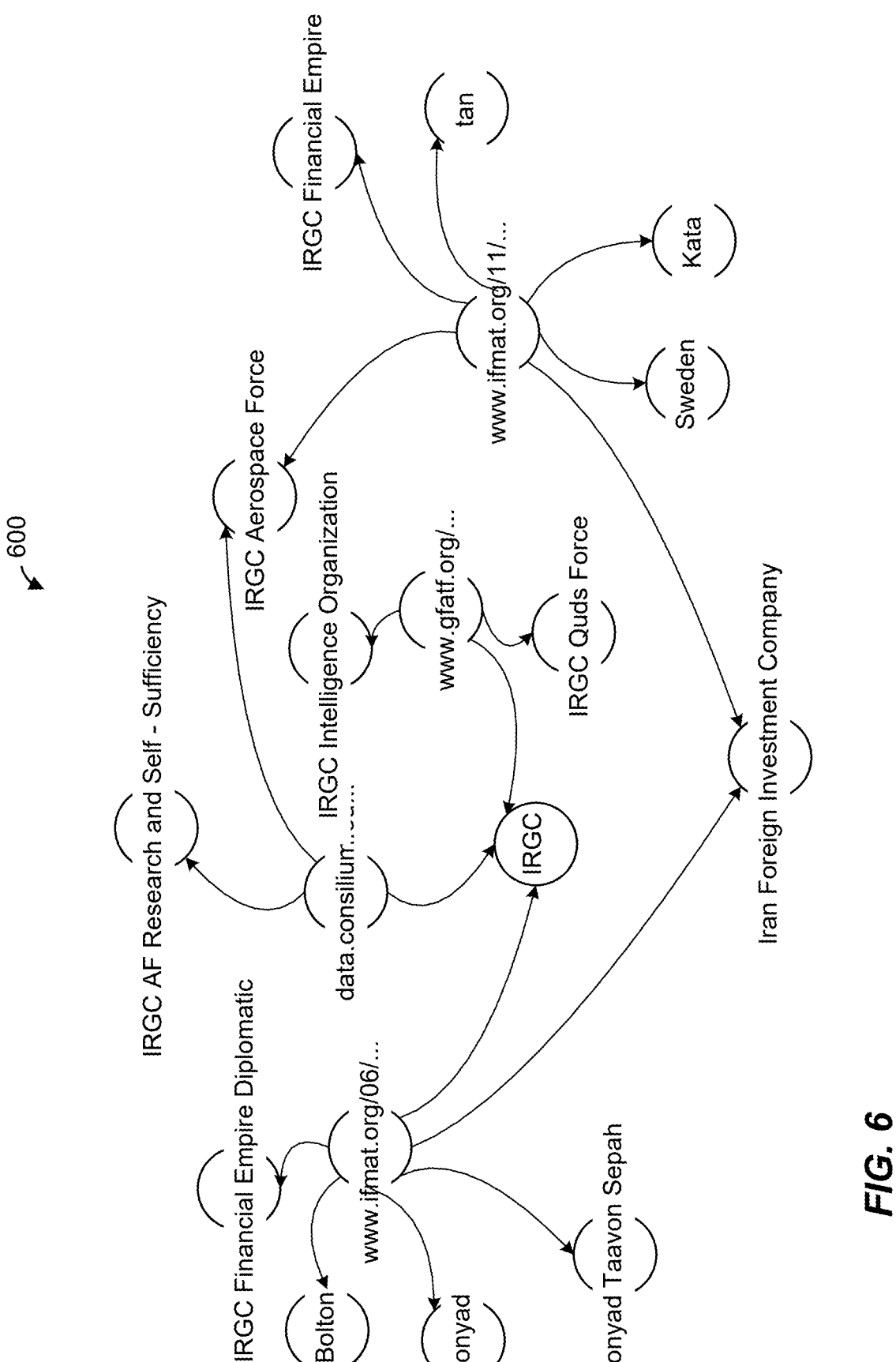
FIG. 6 illustrates an example graph that corresponds to the graph of FIG. 5 with several document nodes further expanded, according to an embodiment.

The dataset query response application 104 may be further configured to allow the user to expand document nodes such that other entities that were identified in the documents, but were initially filtered out, become visible to the user. For example, the dataset query response application 104 may allow the user to expand a document node by clicking on or otherwise engaging with the document node. Referring, for example, to FIG. 6, a graph 600 corresponds to the graph 500 that has several document nodes further expanded through input from the user. For example, nodes that correspond to documents associated with links "www.ifmat.org/06/ . . . " and "www.ifmat.org/11/ . . . " are expanded in the graph 600. Expanding the nodes may allow the user to discover previously unknow information, such as previously unknown entities and/or relationships. As an example, as illustrated in FIG. 6, by expanding the nodes that correspond to documents associated with links "www.ifmat.org/06/ . . . " and "www.ifmat.org/11/ . . . ", the user may see that the Iran Foreign Investment Company is mentioned in both documents. The user may thus learn of the existence of the Iran Foreign Investment Company and/or glean the relationship of the Iran Foreign Investment Company to IRGC. The dataset query response application 104 may also allow the user to view the documents by engaging with the nodes corresponding to the documents. For example, in response to detecting that the user is hovering over a node or is otherwise engaging with the node (e.g., double-clicking on the node) the dataset query response application 104 may display the content of the associated document to the user or may re-direct the user to a webpage that displays the content.

In general, as described in more detail below, such visual depiction of the entities and the relationships identified in the relevant documents from which the answers were extracted may lead the user to discovery of various entities and/or relationships, such as "known-unknown" entities and/or relationships and/or "unknown-unknown" entities and/or relationships, that the user may not have discovered from the relatively small context windows provided to the user along with the answers in the search results field 210 of the question and answer graphical user interface 200. The user may also further explore the dataset based on the learned information. For example, the user may enter further queries into the query input field 206 of the question and answer graphical user interface 200 and/or the entity field 304. Such further queries may be based on or sparked by the learned information. For example, in the illustrated embodiment, the user may enter a question related to Iran Foreign Investment Company into the query input field 206 and may thus receive answers to the new query. As another example, the user may enter "Iran Foreign Investment Company" into the entity field 304 and may thus view a graph that shows nodes and relationships related to the Iran Foreign Investment Company.

Figure 7:
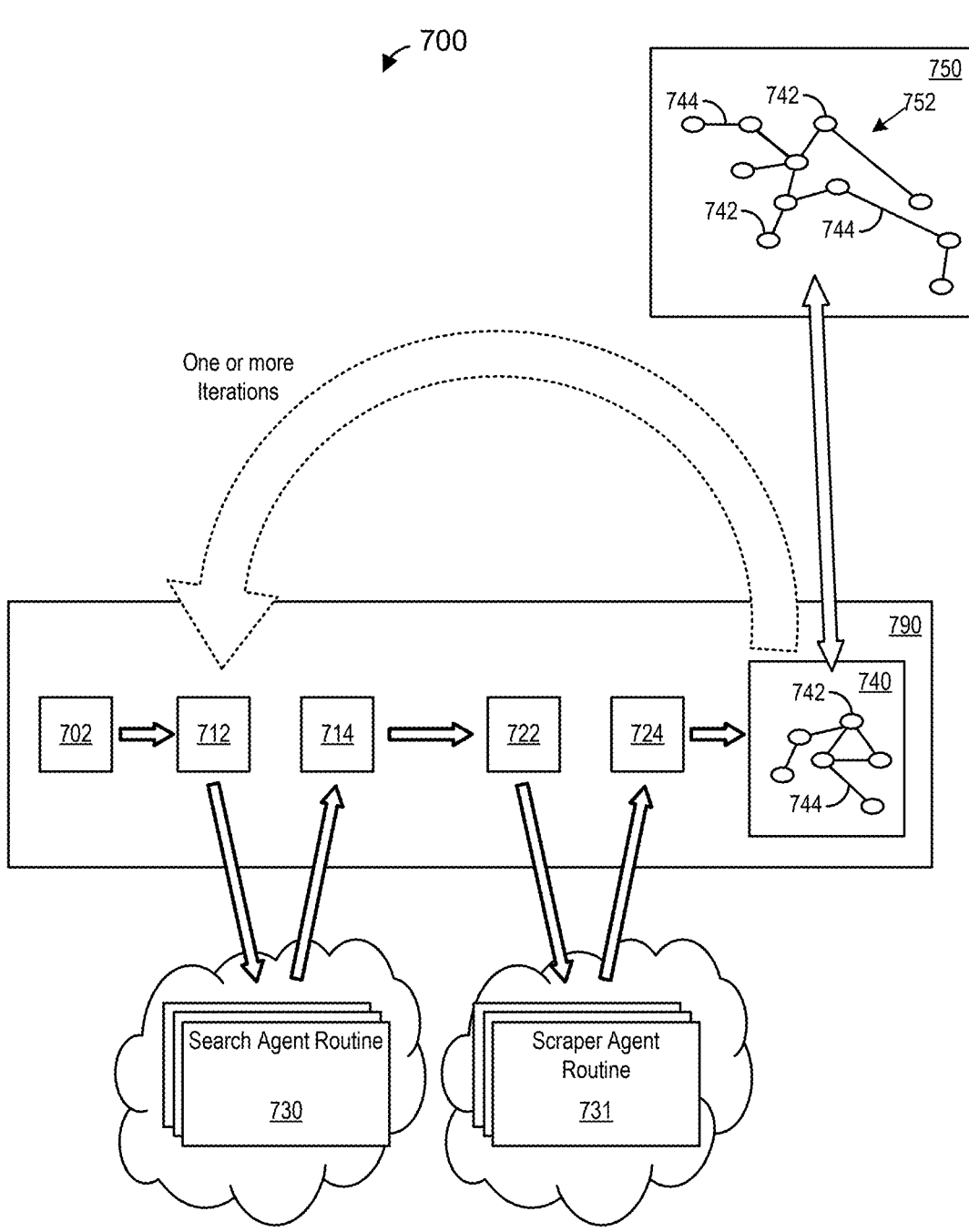
FIG. 7 is a block diagram of an example data collection and pre-processing system, according to an embodiment.

FIG. 7 is a block diagram of an example data collection and data pre-processing system 700, according to an embodiment. Reference is also made to FIG. 8, which shows a flowchart of a method 800 for collecting and pre-processing data, according to an embodiment. The data collection and pre-processing system 700 may be a multi-session and/or multi-iteration search system configured to perform searches to identify and obtain information relevant to search targets of intertest to a user. The method 800 may be implemented by the data collection and pre-processing system 700 (e.g., implemented on search circuitry 790 of the system 700). In an embodiment, the data collection and pre-processing system 700 and the method 800 are implemented by the data collection application 102 of the system 100 of FIG. 1. In other embodiments, the data collection and pre-processing system 700 and/or the method 800 are implemented in systems different from the system 100 of FIG. 1. For ease of explanation, the data collection and pre-processing system 700 and the method 800 are described with reference to the system 100 of FIG. 1.

At a block 802, the data collection and pre-processing system 700 (e.g., the data collection engine 110 of FIG. 1) may obtain multiple seed terms 702 for a search target. The multiple seed terms 702 may, for example, be received from a user of the data collection and pre-processing system 700 performing an inquiry regarding the search target.

The search target may have a target type. For example, the target type may be a "person", an "organization", a "location", a "phone number", a "social media account" or other target types of interest. The target type may define seed term fields or suggestions for the user. Further, as discussed below, the target type may be used to determine a relevant baseline dataset 750, that may be used for a comparison to scraped result data 724 generated by the data collection and pre-processing system 700.

The multiple seed term 702 may include known (or suspected) identification information for the search target. For example, seed terms may include entity relationships, names, nicknames (or other aliases), email addresses, phone numbers, home/work addresses, locations, identification numbers (driver's license numbers, social security numbers, passport numbers, tax identification numbers, or other identification numbers), birthdate, ancestry, friends, work associates, and/or other identification or relationship information.

At a block 804, the data collection and pre-processing system 700 (e.g., the data collection engine 110 of FIG. 1) may apply a prioritization protocol to combine, permute, broaden, apply Boolean operators to, and/or otherwise restructure the seed terms 702 into a set of first search terms 712. The prioritization protocol may be defined using a relevance of the seed terms, e.g., which may be provided by the user, a confidence level in each of the terms, or from another source such as a default relevance based on a type of the seed term (for example, identification numbers may be more static over time than nicknames; thus, identification numbers may, in some relevance schemes, be given more weight).

At a block 810, the data collection and pre-processing system 700 (e.g., the data collection engine 110 of FIG. 1) may instance a query session using the first search terms. Instancing the query session at block 810 may include a block 812 at which the system 700 may instance one or more search agent routines 730. The search agent routines may include bots, daemons, and/or other automated processes (which may be logically, physically, and/or geographically distributed). The search agent routines 730 may execute external search queries of individual (or other subsets) of the first search terms. The external search queries may be performed on internet search engines (Google, Bing, Baidu, DuckDuckGo, Yandex, and/or other search tools), archives, social media, and/or other network-based information tools. In some cases, interaction techniques with different search resources may be assigned to different search agents. The distribution of the search agent routines 730, the division of the search terms into subsets, and/or the division of interactions with different search resources may frustrate monitoring attempts to identify search patterns originating from a single source. For example, geographic distribution of the search agent routines 730 may provide the appearance of unassociated searches because the searches originate from different locations, IP addresses, device types, and/or other geographic differences. The division of search terms may prevent pattern identification through monitoring the searches of any one individual logical agent. The division of interactions may frustrate monitoring connection patterns of any one individual logical agent in an attempt to identify an information gather operation for additional monitoring. Thus, the implementation of search agent routines improves the security and privacy of the data collection and pre-processing system 700.

After receiving first response data 714 to the first external query for the first search terms, at a block 814, the data collection and pre-processing system 700 (e.g., the data collection engine 110 of FIG. 1) may transform the first response data, the multiple seed terms, and/or response data from other previous iterations (for third or later search iterations) into search result documentation 722. Search result documentation may include locators (e.g., such as URLs, database entry locations, memory locations, or other locations) detailing where the data corresponding to the search result may be stored. In various implementations, the query session may not necessarily be used to scrape (or otherwise obtain) network accessible data found in the search queries performed within the query session.

In various implementations, at a block 830, the data collection and pre-processing system 700 (e.g., the data collection engine 110 of FIG. 1) may instance a scraping session. Instancing the scraping session at block 830 may include a block 832 at which the data collection and pre-processing system 700 (e.g., the data collection engine 110 of FIG. 1) may instance one or more scraper agent routines 731. Use of separate query and scraping sessions for search query execution and retrieval of data associated with those search results may frustrate attempts to correlate visitation/scraping of a network location with an appearance of that location within search results. Similar to the obfuscation gained by assigning different search queries to different search agent routines, obfuscation may be additionally or alternatively gained by using separate search agent routines and scraper agent routines to execute search queries and scrape network resources, respectively.

The scraper agent routines may use access cookies from a cookie factory. A cookie factory may obtain authorization cookies to provide scraper agent routines with simplified access at the time of scraping. The cookie factory may obtain the authorization cookies from a $3^{rd}$ party website by solving a complex set of questions, that may be difficult for scraper agents to solve, for example. By generating the authorization cookies in advance, the number of scraper agents may be scaled up. Thus, for example, more scraper agents may be used as compared to a system that does not generate authorization cookies in advance. In some examples, the cookie factories may obtain cookies from specific cookie acquisition sessions (e.g., separate from scraping sessions) and/or collect cookies as encountered by the scraper agent routines. Cookie factory agent routines and/or scraper agent routines may use website toolkits to capture, store, and share authorization cookies to allow simplified browsing such that any subsequent visit by the routines appears as normal browser activity. The cookies may be timed and marked as retired when they are rejected by their corresponding sites.

At a block 834, the data collection and pre-processing system 700 (e.g., the data collection engine 110 of FIG. 1) may use the scraper agent routines 731 to access locations in the search result documentation to obtain scraped result data 724.

The data collection and pre-processing system 700 (e.g., the data pre-processing engine 112 of FIG. 1) may perform image processing on the scraped result data 724. For example, the data collection and pre-processing system 700 (e.g., the data pre-processing engine 112 of FIG. 1) may perform optical character recognition (OCR), execute (e.g., via the search agent routines) reverse image searching to identify other results related to the images and to identify alternate sources hosting the same image, and/or analyze images for geospatial or other meta data.

At a block 850, the data collection and pre-processing system 700 (e.g., the data pre-processing engine 112 of FIG. 1) may perform curation of the scrape result data 724. For example, the data collection and pre-processing system 700 (e.g., the data pre-processing engine 112 of FIG. 1) may perform extract, transform, and load (ETL) operations on the entries within the scrape result data 724. The data elements may be recognized using a regular expression (REGEX) based selector, for example. The data collection and pre-processing system 700 (e.g., the data pre-processing engine 112 of FIG. 1) may normalize data elements (such as identification numbers, dates, or other data elements) into a pattern-based selector to promote machine-understanding/recognition of the data element. In some cases, data captured in various diverse formats may be normalized into standard formats. Geospatial data, such as latitude and longitude, may also be extracted to this dataset, e.g., normalized into base-16 and base-32 geohashes. In some cases, recognition and/or format normalization may be used to reduce redundant entries. For example, the scraped result data 724 may be de-duplicated amongst themselves and the previous search iterations.

In various implementations, once obtained, the multi-session search results may be maintained by the data collection and pre-processing system 700 as separate and defined set of documents or datasets (e.g., as separate datasets 107 stored in the data store 106 of FIG. 1). Thus, the scraped result data 724 may be held for further analysis. Both the raw and processed data resulting from each iteration may be retained. Thus, in some implementations, the scraped result data 724 are not necessarily integrated with other data to generate a super set, but instead, may be maintained as a targeted, unitary set independently accessible and analyzable.

Nevertheless, the search results may be used to update other datasets, such as baseline datasets, regardless of whether the multi-session search results themselves are maintained, at least in one storage location, as an independent data entity.

At a block 852, the data collection and pre-processing system 700 (e.g., the data pre-processing engine 112 of FIG. 1) may perform machine-learning (ML) operations on the scraped result data 724 (e.g., after curation). For example, the data collection and pre-processing system 700 (e.g., the data pre-processing engine 112 of FIG. 1) may perform natural language processing (NLP) and/or other processing on the scraped result data 724 to generate graph data. The data collection and pre-processing system 700 (e.g., the data pre-processing engine 112 of FIG. 1) may perform NLP in one or more languages, such as, English, French, German, Russian, Chinese, Turkish, Urdu, Arabic, and/or other language of interest. Through the ML operations, the data collection and pre-processing system 700 (e.g., the data pre-processing engine 112 of FIG. 1) may determine relationships between the search target and other data elements. The data collection and pre-processing system 700 (e.g., the data pre-processing engine 112 of FIG. 1) may then map these relationships as nodes and edges in graph data 740. The graph data may be stored in a graph database (e.g., the graph database 108 of FIG. 1). The nodes may represent data elements, while the edges describe relationships between the data elements. For example, a node 742 may include a name of an individual who is the search target while another node 742 includes a name of an individual who is known or otherwise related to the search target, an edge 744 between these nodes 742 may include the relationship "knows" or "is related to". Any tuple including two data elements and a relationship may be represented in the graph data 740 using an edge 744 connecting a pair of nodes 742. The data collection and pre-processing system 700 may store the graph data in a graph database (e.g., the graph database 108) in association with the corresponding documents from which the graph data was obtained.

At a block 854, the data collection and pre-processing system 700 (e.g., the data pre-processing engine 112 of FIG. 1) may compare the graph data 740 to a baseline dataset 750. The baseline dataset 750 may include a baseline graph representation 752. In various implementations, the data collection and pre-processing system 700 (e.g., the data pre-processing engine 112 of FIG. 1) may perform the comparison by merging the baseline graph representation 752 with the search graph data 740 thereby enriching the baseline dataset 750 when nodes and edges present in the search graph data 740 are absent from the baseline graph representation 752.

In some embodiments, the baseline dataset 750 may be characterized by a particular data category. The data category may encompass multiple target types, including the target type. For example, the data category may include data related to a particular country and the target type may be a person that exists in, is a resident of, and/or is a citizen of the country. Similarly, the target type may be a judicial entity such as a corporation with a presence in, headquartered in, incorporated in, the country. The baseline dataset 750 may include a baseline dataset associated with a particular user. Thus, the target type may include a search target provided by the particular user. The data category may include a date range in which a target event occurred. The data category may include a geographic region, a jurisdictional region, a language, an academic subject, or otherwise define a subject space defining some relationship between the data elements held within the baseline database. The target type may be within the defined subject space such that data elements with relationships to the search target are likely to be appropriately included within the baseline dataset 750. In other embodiments, a single baseline dataset 750 may be used across multiple data categories and/or multiple users.

In some examples, the data collection and pre-processing system 700 (e.g., the data collection engine 110 of FIG. 1) may perform an iterated search that includes multiple search iterations. In some cases, the data collection and pre-processing system 700 (e.g., the data collection engine 110 of FIG. 1) may perform a predetermined number of iterations before completing the iterated search. In some cases, the data collection and pre-processing system 700 (e.g., the data collection engine 110 of FIG. 1) may determine whether particular metrics are met to determine to complete the iterations. In some implementations, if the search graph structure is left unchanged after result de-duplication (or changed less than a given threshold) the search iterations may be ceased because the metric indicates that the relationships that can be gleaned from accessible network sources have been found and further refinement of the search may not necessarily yield additional results. Other metrics may be used to determine search iteration stopping points.

Sessions and iterations may differ from a search course. A search course may be a period or thread over which search iteration results are stored within a designed search graph structure. A search course may correspond to a set of related searches and/or search iterations. A search course may last until a completion event occurs. For example, a period of time elapses over which no additional results are retried for the search data structure, a user ends course and/or indicates that the search data structure be locked in changes, and/or other event. A search course may include multiple search iterations and multiple sessions. In some implementations, a search course may be persistent in time, e.g., a user may return to a course in progress after a period of inactivity. Accordingly, each search course may have a corresponding search data structure. Additionally or alternatively, each search course may contribute the course's results to a different search data structure.

In some implementations, collected documents are RegEx'd using seed terms and the documents with high matches are linked to the seed terms in any of the graph data structures.

In some implementations, Search Engine Results Pages (SERP) are scraped (1st order) and embedded links are extracted for scraping (2nd order) as part of an iteration. After multiple iterations, seed terms from each iteration are tied to the previous and newly discovered nodes and relationships extracted from various ML processes, essentially merging the multiple separate graphs into one. These graphs can also be merged into a baseline graph.

Figure 9:
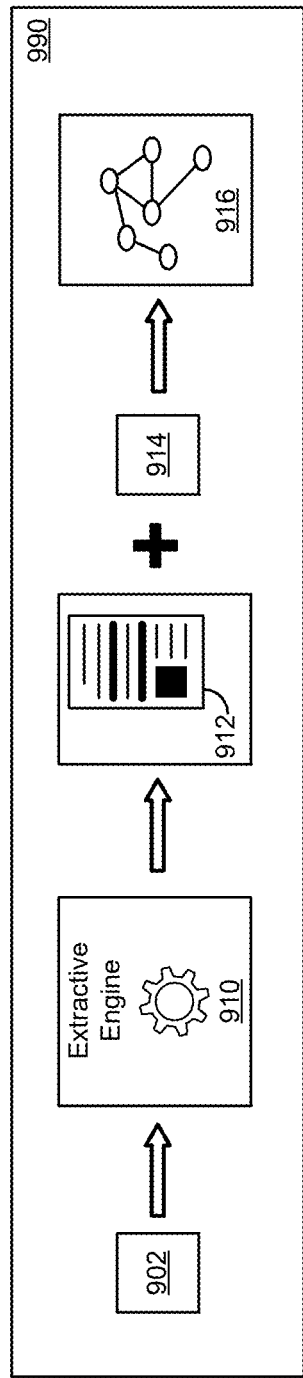
FIG. 9 is a block diagram of an example dataset query response system, according to an embodiment.

Referring now to FIG. 9, an example dataset query response system 900 is shown. Reference is also made to FIG. 10, which shows a flowchart of a method 1000 for providing a visual representation of search results, according to an embodiment. The method 1000 may be implemented by the example dataset query response system 900 (e.g., implemented on database query response circuitry 990 of the system 900). In an embodiment, the dataset query response system 900 and the method 1000 are implemented by the dataset query response application 104 of the system 100 of FIG. 1. In other embodiments, the dataset query response system 900 and/or the method 1000 are implemented in systems different from the system 100 of FIG. 1. For ease of explanation, the dataset query response system 900 and the method 1000 are described with reference to the system 100 of FIG. 1.

At a block 1002, the dataset query response system 900 (e.g., the answer engine 124 of FIG. 1) may obtain a natural language query 902. For example, the dataset query response system 900 (e.g., the answer engine 124 of FIG. 1) may receive a query from a user inputting the query on a user terminal device. The natural language query 902 may be in the form of a traditional search, a conversational (e.g., natural language) question, a declarative sentence, or other word grouping. The natural language query may be applied by the dataset query response system 900 (e.g., the answer engine 124 of FIG. 1) to the input layer of an excerpting transformer 910. In various implementations, the excerpting transformer 910 may execute on the database query circuitry 990 and/or other hardware resources controlled (and/or at least temporarily requisitioned) by the dataset query response system 900.

The natural language query may be associated with a defined set of search result content (e.g., a search data structure corresponding to a search course, a selected portion of a baseline data structure, a curated data structure, and/or other data structure) or other defined set of database content. The natural language query is thus run on the documents relevant to the targeted search rather than against an entire data holding.

In some cases, a user may be provided with a listing of the available datasets and may select among the datasets before (or contemporaneously with) the user's provision of the natural language query. In some implementations, a dedicated excerpting transformer may be paired with each dataset. Accordingly, once a dataset is selected, the appropriate dedicated excerpting transformer may be called/executed to respond to the query.

At a block 1004, the dataset query response system 900 (e.g., the answer engine 124 of FIG. 1) may process the natural language query using a natural language processing model to obtain one or more key query terms from the natural language query. The natural language query may be parsed to obtain terms. The terms may be tokenized for search/filtering purposes by a machine learning system.

At a block 1006, the dataset query response system 900 (e.g., the answer engine 124 of FIG. 1) may perform a relevance-ranked search on a plurality of documents based on the one or more key query terms, to obtain a subset of the plurality of documents relevant to the natural language query. For example, the dataset query response system 900 (e.g., the answer engine 124 of FIG. 1) may access the defined set of content associated with the natural language query to analyze multiple documents within the defined set. For example, the documents may include data content from various sources (websites, database entries, search records, government dossiers, and/or other sources), which for example may have been identified within a specific multi-session search or other specific search. In an example, the excerpting transformer 910 may be used for the analysis.

The dataset query response system 900 (e.g., the answer engine 124 of FIG. 1) may perform the relevance-ranked search using the key query terms obtained at block 1004. For example, the key query terms may be used to search/filter the documents to a selected group of documents that contain at least some information related to the natural language query and/or a selected group that has a volume of documents that can be processed by the excerpting transformer 910 within a time limit for processing. In some cases, up to 12,000 or more documents may be selected for processing by the exception transformer 910.

In various implementations, the dataset query response system 900 (e.g., the answer engine 124 of FIG. 1) may initiate the analysis by the excerpting transformer 910 in response to (e.g., after receipt of) the natural language query and/or the search results. Thus, the defined set may not necessarily be pre-analyzed ahead of receipt of queries about the defined set.

In some implementations, initial analysis may be performed to allow the excerpting transformer 910 to ingest/parse incoming search engine results for lower latency responses to queries regarding the defined set.

The dataset query response system 900 (e.g., the answer engine 124 of FIG. 1) may compare the natural language query 1002 (or the key query terms obtained from the natural language query) to the documents within the defined set to identify at least one response document within the defined set that is responsive to the natural language query. For example, at least a portion of the response document may be responsive, at least in part, to the natural language query.

At a block 1008, the dataset query response system 900 (e.g., the answer engine 124 of FIG. 1) may extract answers to the natural language query from documents among the subset of documents. For example, the excerpting transformer 910 may further process the subset of documents to extract answers to the natural language query from relevant documents among the subset of documents.

The dataset query response system 900 (e.g., the answer engine 124 of FIG. 1) may further obtain source locations 914 for response documents 912 from which the answers were extracted. A source location may include a network resource, such as a website, database identifier and entry, a social media account, and/or other location that identifies where the response document was originally obtained. Accordingly, the dataset query response system 900 (e.g., the answer engine 124 of FIG. 1) obtains (via execution of the transformer 910) both a response document (at least in part) answering the question and a location 914 specifying where the response document originated. In various implementations, the dataset query response system 900 (e.g., the answer engine 124 of FIG. 1) may obtain identifiers of both the response document and the source location of the response document 912 at an output layer of the excerpting transformer 910.

Once the query is processed and the answers are extracted, the results may be displayed in a table format. The results include extracted answers, an excerpt window from the source where the answer is extracted from, the source link, and a score that shows the confidence level of that answer. Same answers extracted from multiple sources may be aggregated under the answer, sorted by score.

In various implementations, the excerpting transformer 910 may include a deep neural network with one or more hidden layers between the input and output layers that interact with the dataset query response system 900 (e.g., the answer engine 124 of FIG. 1). The hidden layers may include various portions of a trained structure of the excerpting transformer 910 that allow the transformation of the query input to the excerpted response output from the database.

The training process for the excerpting transformer 910 may include supervised and/or unsupervised training where training sets include tuples of queries, "ground truth" excerpted answers, and "ground truth" locations may be provided. For example, in supervised training, the excerpting transformer 910 may be provided query and generate an answer-location pair. Then, the "ground truth" answer and location may be provided as feedback for training the excerpting transformer 910. In unsupervised learning, the various tuples may be provided to the excerpting transformer 910, e.g., without ground truth feedback and the excerpting transformer 910 may determine groupings within the training set based on the interactions.

In some cases, transfer learning may be used. For example, an existing transformer (and/or) hidden layers from existing transformers may be implanted into the excerpting transformer 910 to provide starting point functionality to the excerpting transformer 910 before training. As one example, a ChatEPT transformer (EPT—Extractive Pre-trained Transformer) may be used as a foundation for the trained excerpting transformer 910.

Various large language models may be used. For example, BERT models may be used in which language elements (e.g., subject, object, verb, etc.) may be tokenized and represented with vector information for interrelation (e.g., for contextual meaning) and vector information for positional relationships within a sentence. The vector information may be used to control attention within the BERT model. The BERT model may be trained using language masking where the model undergoes unsupervised masking training where the model attempts to predict masked portions (e.g., masked tokens) within a sentence via the training. The system learns to recreate language patterns through this training.

Name entity recognition (NER) models, which may include specific language models and/or multilingual models may be used.

Implementations based on BERT may implement a DeBERTa model which may disentangle treatment of context and position information for enhanced decoding performance. Implementations based on BERT may implement a ROBERTa model in which the hyperparameter and training set size are tuned to train a BERT model above a threshold level.

In various implementations, various schemes for attention and position management within the excerpting transformer may be used.

In some implementations, an excerpting transformer 910 may be trained for operation on defined sets, but not necessarily for operation on any specific defined set. Accordingly, in various implementations, the excerpting transformer 910 may receive a natural language query and use a previously unanalyzed defined set (such as a newly obtained set of search results from the data collection and pre-processing system 700) or on a dataset for which collection is in progress to respond to the query, e.g., without previous training specific to that previously unanalyzed defined set.

In some implementations, the excerpting transformer 910 may be trained for a specific one and/or specific set of defined datasets. Accordingly, the excerpting transformer 910 may be used to respond to a natural language query 902 when the query pertains to one or more of the curated datasets on which the excerpting transformer 910 has been trained.

In an embodiment, the dataset query response system 900 (e.g., the answer engine 124 of FIG. 1) may cause generation of a responsive rendering of the location 914 and response document 912. The responsive rendering may include a presentation of the response document with an indication of the source location where the response document was found. Within the rendering, the data within the document that is identified as responsive to the query may be rendered with a visual emphasis to allow the relevant window of data to be seen by the user in the original context in which that data was found. The visual emphasis may include highlighting, italics, bolding, or other font alteration for emphasis. Overlays such as callouts, tooltips, encircling, or other graphic overlays may be used. In some implementations, the rendering and/or rendering instructions for a terminal display, browser (or other rendering system) may be generated by the excerpting transformer 910 as a portion of its output.

In some scenarios, multiple documents may be identified that are responsive to the query and/or most responsive to the query. The excerpting transformer 910 may provide multiple responsive documents in response to the query.

At a block 1010, the dataset query response system 900 (e.g., the graph engine 126 of FIG. 1) may obtain graph data using document links associated with documents from which the answers were extracted. For example, the dataset query response system 900 (e.g., the graph engine 126 of FIG. 1) may access the graph database 108 using the links associated with documents from which the answers were extracted to obtain the graph data. The graph data may include i) nodes representing the relevant documents among the subset of documents and entities identified in the relevant documents and ii) edges representing relationships between the relevant documents and the entities identified in the relevant documents.

A graph may thus be created with documents related to the defined search. Users can use the excerpting transformer 910 to integrate the search graph and find relevant documents via queries to the excerption transformer. After answers are fetched, the graph function may find all links related to the question and use the links as a starting point for graph queries. Users may specify the data type that they are looking for such as name, location, address, and other types, and a value (John Doe, Florida, etc.). The graph function may then query the graph database for the documents related to the question, and find these values, if there are any. At a block 1012, the dataset query response system 900 (e.g., the graph engine 126 of FIG. 1) may generate a graphical rendering to display the relationships between the relevant documents among the subset of documents and the entities identified in the relevant documents. At block 1014, the dataset query response system 900 (e.g., the graph engine 126 of FIG. 1) may display the graphical rendering to the user. Displaying the graphical rendering may enable the user to discover information previously unknown to the user. The results may be displayed in graph format as nodes and edges, with the source node being the link the values are extracted from. The user can click on a source node to expand it to show other related data from the graph.

The graphical rendering may include relationships connecting the documents to various entities listed, described, and/or otherwise represented in the documents. Thus, the graphical rendering may elucidate otherwise distant or tenuous relationships that may exist within a search data structure, a baseline data structure, or other defined set that are coincidentally more closely connected by the responsive documents for the query. In other words, the response data structure generates a set of entities in which the interrelation is the query itself. Selecting for entities interrelated by a query allows for investigation of additional coincidental relationships between such entities to (in some cases) recognize connections that are otherwise indiscernible against the background of thousands/millions/billions of connections present in the defined set. The combination of an excerpting transformer with a graph data structure output improves both systems. ChatEPT and other transformers have limited context window size where two or more documents will not necessarily fit within the context window to understand the relevance across all the documents. The graph database highlights the relevance among documents and helps users find the unknown-unknown/new information outside the transformer context windows.

Figure 11:
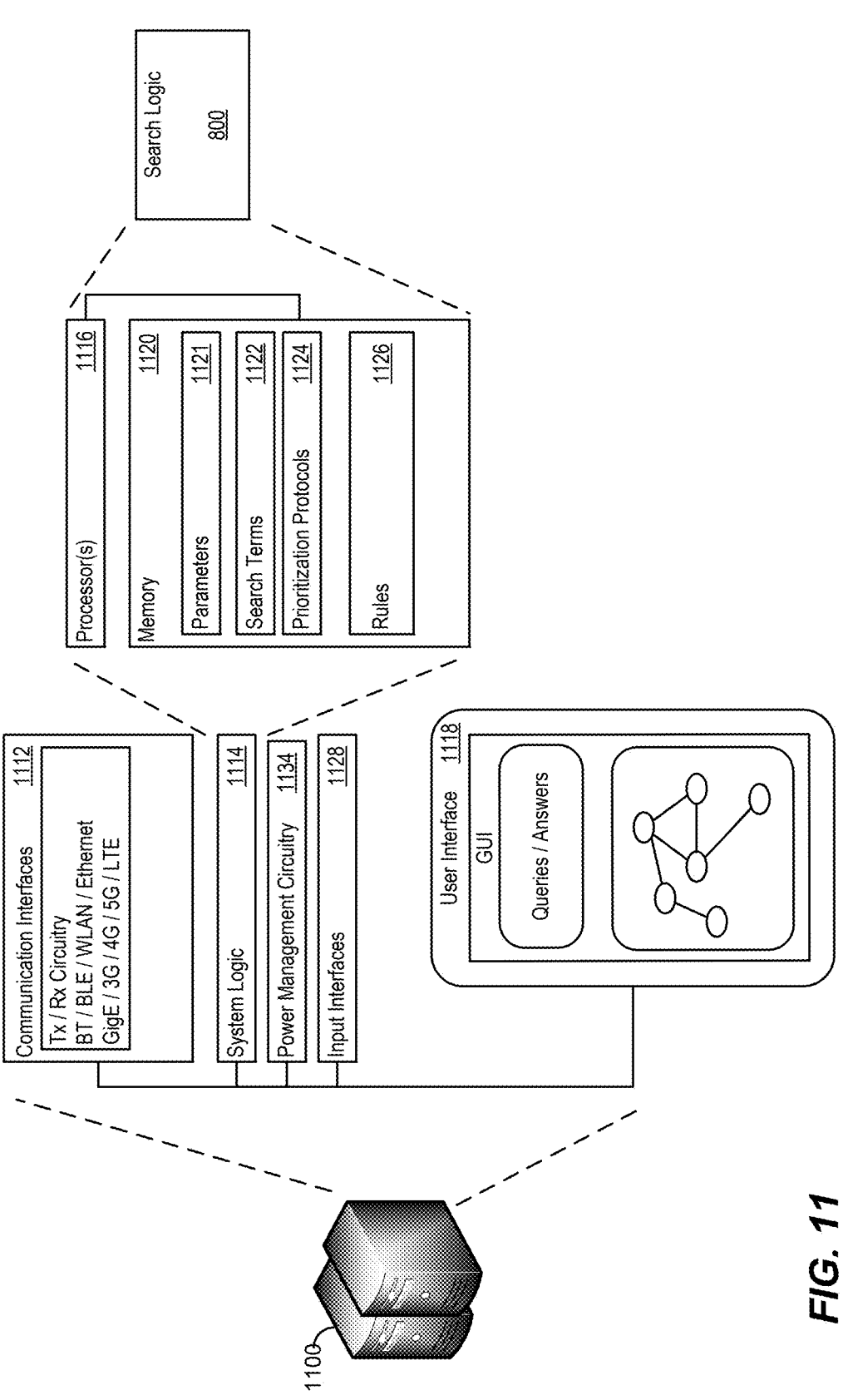
FIG. 11 is a block diagram of an example data collection and/or data pre-processing execution environment, according to an embodiment.

FIG. 11 shows an example multi-session search execution environment (MSEE) 1100, which may provide a hardware environment for execution of the method 800 for collecting and/or pre-processing data. The hardware of the MSEE 1100 may be special purpose circuitry specifically configured to execute the operations of the multi-session search protocol discussed above. The MSEE 1100 may include system logic 1114 to support multi-session instancing, search agent routine control and management, prioritization protocol execution, search iteration, encryption and decryption, and/or other multi-session search operations. The system logic 1114 may include processors 1116, memory 1120, and/or other circuitry, which may be used to implement the method 800, and/or other logic discussed herein such as the method 1000.

The memory 1120 may be used to store search terms 1122 and/or prioritization protocols 1124. The memory 1120 may further store parameters 1121, such as database locations, security credentials, search histories, seed terms, permutation parameters, result rankings, and/or other parameters that may facilitate multi-session search operations. The memory may further store rules 1126, which may support combination schemes, prioritization protocol execution, operation of search agent routines, and/or other operations.

The memory 1120 may further include applications and structures, for example, coded objects, templates, or one or more other data structures to support multi-session search operations. The MSEE 1100 may also include one or more communication interfaces 1112, which may support wireless, e.g., Wi-Fi, WLAN, cellular (5G, 4G, LTE/A), and/or wired, ethernet, Gigabit ethernet, optical networking protocols. Additionally, or alternatively, the communication interface 1112 may support secure information exchanges, such as secure socket layer (SSL) or public-key encryption-based protocols for sending and receiving private data. The MSEE 1100 may include power management circuitry 1134 and one or more input interfaces 1128.

The MSEE 1100 may also include a user interface 1118 that may include human-machine interfaces and/or graphical user interfaces (GUI). The GUI may be used to present options for prioritization, seed term input, search result review, and/or other options.

The MSEE 1100 may be deployed on distributed hardware. For example, various functions of the MSEE 1100, e.g., while implementing the method 800 for collecting and/or pre-processing data, may be executed on cloud-based hardware, distributed static (and/or semi-static) network computing resources, and/or other distributed hardware systems. In various implementations, centralized and/or localized hardware systems may be used. For example, a unitary server or other non-distributed hardware system may perform the operations of the method 800 for collecting and/or pre-processing data.

Figure 12:
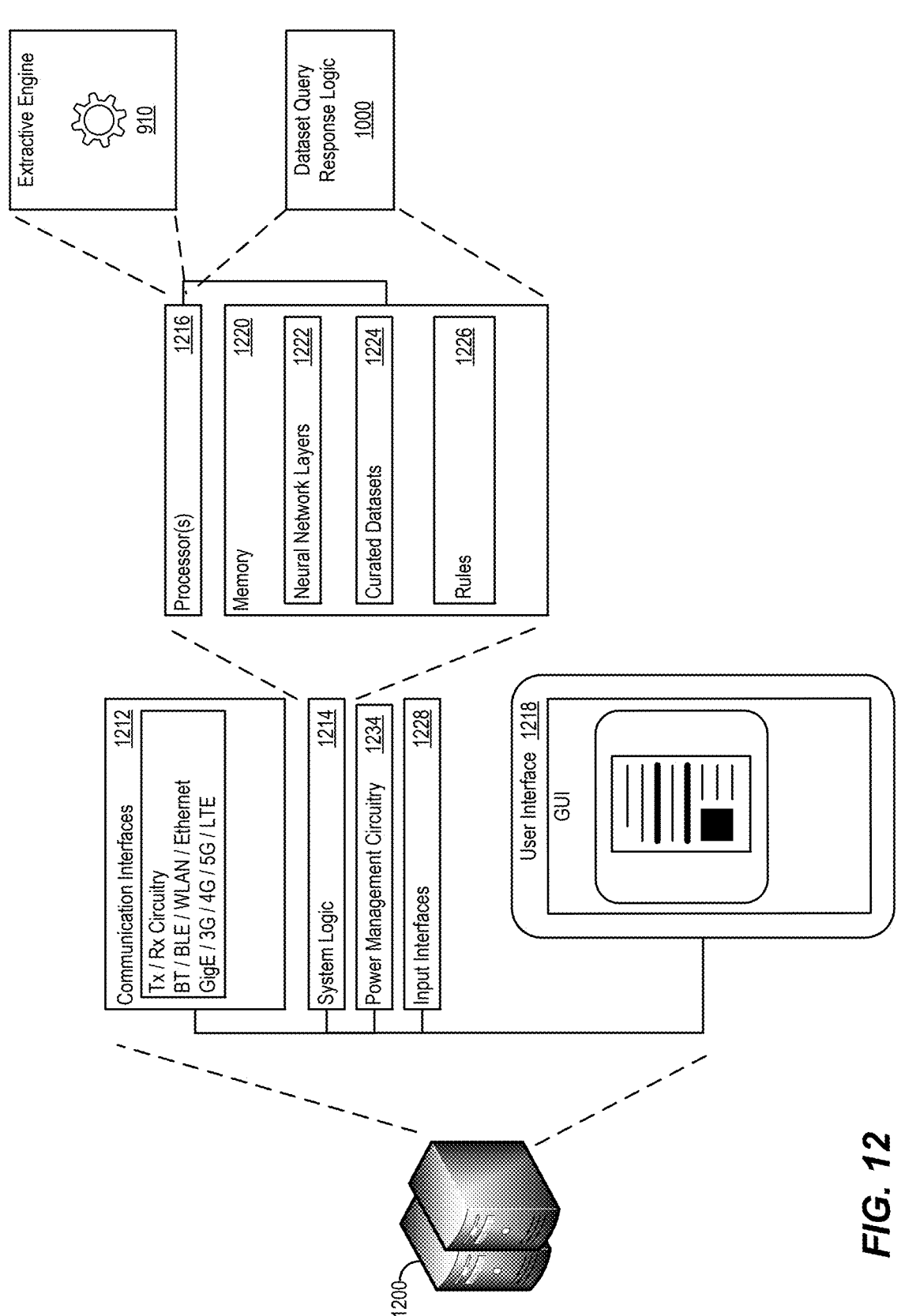
FIG. 12 is a block diagram of an example query response execution environment, according to an embodiment.

FIG. 12 shows an example query response execution environment (QREE) 1200, which may provide a hardware environment for execution of the method 1000 for providing a visual representation of search results. The hardware of the QREE 1200 may be special purpose circuitry specifically configured to execute the operations of the dataset query response system 900 discussed above. The QREE 1200 may include system logic 1214 to support multi-session instancing, search agent routine control and management, prioritization protocol execution, search iteration, encryption and decryption, and/or other multi-session search operations. The system logic 614 may include processors 1216, memory 1220, and/or other circuitry, which may be used to implement the method 1000 and/or other logic discussed herein such as the method 800. The processors 1216 may include specialized hardware architectures to support the specific operation of the method 1000 and/or other logic discussed herein such as the method 800. For example, the processors 1216 may include tensor processing units (TPUs), neural processor cores, matrix cores, AI cores, and/or graphics processing units (GPUs) to support tensor and/or matrix operations used the execution of a transformer. For example, neural processor cores, such as those available from Apple® Silicon may be used to support the execution of the excerpting transformer 910 and/or other transformers used for implementing the method 1000 and/or other logic discussed herein such as the method 800. TPUs, such as those available from Nvidia® and Intel®, may be used to support the execution of the excerpting transformer 910 and/or other transformers used for implementing the method 1000 and/or other logic discussed herein such as the method 800.

The memory 1220 may be used to store transformer layers 1222 and/or curated datasets 1224. The memory may further store rules 1226, which may support transformer interaction and query application, and/or other operations.

The memory 1220 may further include applications and structures, for example, coded objects, templates, or one or more other data structures to support query handling and response rendering. The QREE 1200 may also include one or more communication interfaces 1212, which may support wireless, e.g., Bluetooth, Wi-Fi, WLAN, cellular (5G, 4G, LTE/A), and/or wired, ethernet, Gigabit ethernet, optical networking protocols. The QREE 1200 may include power management circuitry 1234 and one or more input interfaces 1228.

The QREE 1200 may also include a user interface 1218 that may include man-machine interfaces and/or graphical user interfaces (GUI). The GUI may be used to present options for query input, dataset selection, response data review and/or other options.

The QREE 1200 may be deployed on distributed hardware. For example, various functions of the QREE 1200, e.g., while implementing the method 1000 and/or other logic discussed herein such as the method 800, may be executed on cloud-based hardware, distributed static (and/or semi-static) network computing resources, and/or other distributed hardware systems. In various implementations, centralized and/or localized hardware systems may be used. For example, a unitary server or other non-distributed hardware system may perform the operations of the method 1000 and/or other logic discussed herein such as the method 800.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), a processor core, a graphics processing unit (GPU), a tensor processing unit (TPU), a neural processor core, microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

Various illustrative example implementations are described below. Designations of particular features such as "key", "critical", "important", "essential", "must", and/or other similar designations are included to clarify the relationship of that particular feature to the specific illustrative scenario/scenarios in which the particular feature is discussed. Such a relationship to the same degree may not apply without express description of such a relationship to other implementations. Nevertheless, the various features described with respect to the individual example implementations may be readily and optionally integrated with other implementations with or without various other features present in the respective example implementation.

Figure 13A:
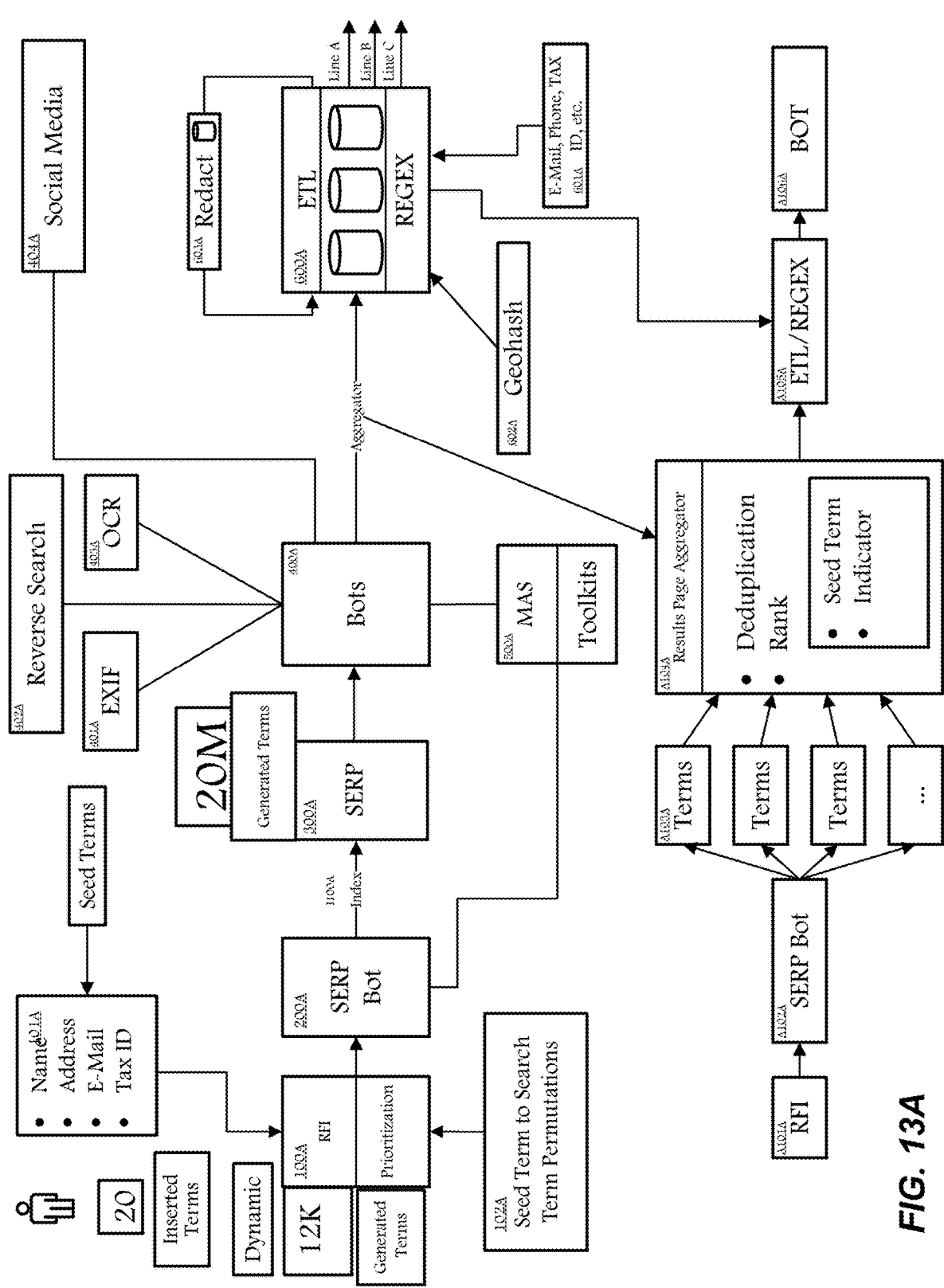
FIGS. 13A-B are block diagrams depicting an illustrative example end-to-end data curation and chat application, according to an embodiment.
Figure 13B:
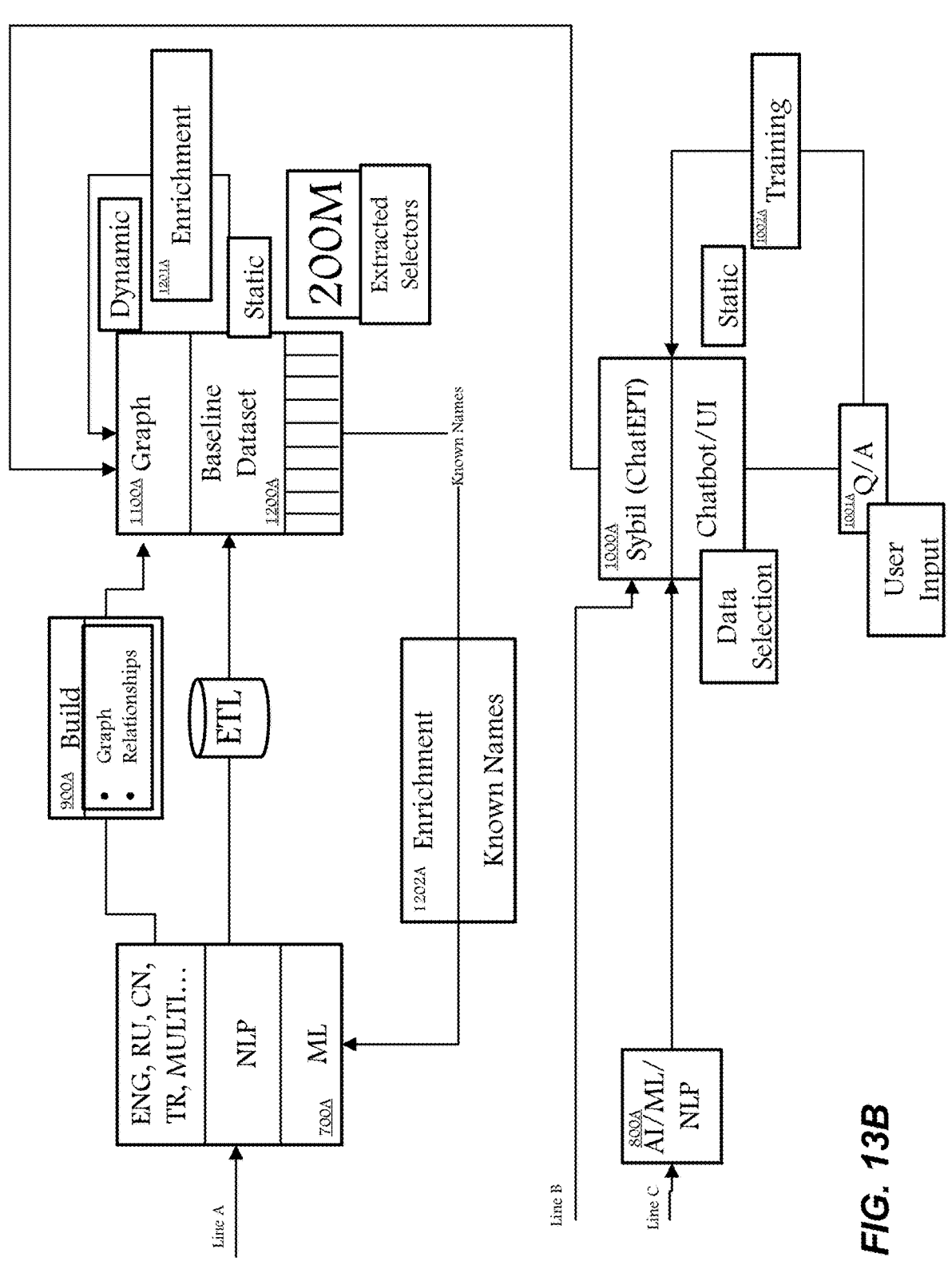

An illustrative end-to-end data curation and distribution process is shown in the flowchart of FIGS. 13A and 13B. The operational flows of FIG. 13A are continued onto FIG. 13B via "Line A", "Line B", and "Line C". Thus, FIGS. 13A and 13B may be viewed as a single flowchart connected across "Line A", "Line B", and "Line C". In the illustrative example, a request for information (RFI) tool (100A) accepts input from a user, who adds a plurality of "seed terms"—identifiable selectors that the user chooses—that include notable fields the user is searching for, such as names, addresses, email addresses, tax IDs, and and/or other target-specific terms (101A), labelling each respective entry. The RFI tool then utilizes prioritization to convert these seed terms into thousands of search terms (102A) before entering the search terms into the SERP bot (200A). This bot then sends the search terms to multiple search engines—such as, Google, DuckDuckGo, Yandex, and Baidu—and aggregates millions of webpages and documents collected from these results pages (300A). These pages are then indexed (I100A) and sent to automated toolkit bots (400A), which extract valuable information from the pages including names, organizations, phone numbers, tax id numbers, and other key data types through various RegEx and machine learning processes, to help curate and form selectors for the graph database. Images are also gathered and processed for Exchangeable image file format (EXIF) data (401A), reverse image search results (402A), and Optical Character Recognition (OCR) data (403A), to help curate and form selectors for the graph database. In addition, a Managed Attribution System (MAS) (500A) ensures that the requests from the SERP bot and toolkits, as well as social media pages (404A) are not traceable or associated. In an illustrative example scenario, the data collection and pre-processing system 700 may perform one or more of the operations discussed above with respect to this example implementation as search iterations and curation of a particular multi-session search.

The data is then sent through the aggregator (A104A), which de-duplicates entries and ranks relevant data based on the prioritization from the original RFI input, dependent on the seed terms and indicators submitted by the user. When the aggregator has finished ranking the data, the data is combined into a large dataset via extract, transform, and load (ETL) operations and pulled out as selectors via RegEx formatting (600A). Certain selectors, such as e-mail, phone, and tax IDs can be extracted via RegEx (601A). Other selectors that cannot be pattern matched are extracted via ML, such as name and organization. Any geospatial data, such as latitude and longitude, is also extracted to this dataset, normalized into base-16 and base-32 Geohash (602A). Finally, any sensitive information that needs to be excluded is filtered through redaction and is securely masked and stored in its own database (603A). In an illustrative example scenario, the data collection and pre-processing system 700 may perform one or more of the operations discussed above with respect to this example implementation as curation and/or ML data processing of the scraped result data of a particular multi-session search. The ETL dataset is then sent to two areas—ML and AI.

In the ML area (700A), Natural Language Processing (NLP) is used to map relations within the dataset for instances such as addresses, names, and family relationships. Our process allows for multi-lingual support, factoring not only English, but other languages such as Russian, Chinese, Turkish, and/or other languages. The relationships mapped by the ML algorithm are then combined and prepared (900A) for generation to a graph (1100A). In addition, further ETL is used on the data processed via ML in order to merge with the baseline dataset (1200A), which is the foundation of all the information used and generated by graph. The baseline dataset also frequently undergoes data enrichment (1201A) in order to keep the graph updated with the most recent and curated mapped relationships. An example shown in the flowchart uses a list of known names matched with data of baby names to detect false positives from matches generated through the ML algorithm, further increasing the validity of the data (1202A). In an illustrative example scenario, the data collection and pre-processing system 700 and/or dataset query response system 900 may perform one or more of the operations discussed above with respect to this example implementation as ML data processing of the scraped result data and/or search data structure of a particular multi-session search.

In the AI area (800A), the dataset from (600A) is sent to a Sybil™ AI Chatbot (1000A) for question answering interactions between the bot and the user. This chatbot utilizes ChatEPT, an extractive pre-trained transformer technology. After selecting a specific dataset from a list of available datasets (for example a listing of recently obtained search result datasets from the data collection and pre-processing system 700 may be used), the user is able to ask questions related to that dataset (1001A), to which the chatbot will provide answers. In addition, a training platform (1002A) is also available in which continued queries are utilized to further train the chatbot to generate more accurate and efficient answers. In an illustrative example scenario, the data collection and pre-processing system 700 and/or dataset query response system 900 may perform one or more of the operations discussed above with respect to this example implementation as query response handling to a natural language query regarding the dataset (1001A).

In an embodiment, a method for providing a visual representation of search results to a user of an application is provided. The method includes obtaining a natural language query provided by the user via a user interface of the application. The method also includes processing the natural language query to obtain one or more key query terms from the natural language query. The method further includes performing, based on the one or more key query terms, a relevance-ranked search on a plurality of documents to obtain a subset of the plurality of documents relevant to the natural language query. The method further still includes extracting answers to the natural language query from relevant documents among the subset of documents. The method additionally includes obtaining, using document links associated with the relevant documents from which the answers were extracted, graph data including i) nodes representing the relevant documents and entities identified in the relevant documents and ii) edges representing relationships between the relevant documents and the entities identified in the relevant documents. The method further still includes generating, based on the graph data, a graph that includes the relationships between the relevant documents and the entities identified in the documents among the subset of documents. The method additionally includes causing the graph to be displayed via the user interface of the application to enable the user to discover information previously unknown to the user.

In another embodiment, a system is provided. The system includes one or more computer readable storage media and program instructions, stored on the one or more computer readable storage media, that, when executed by at least one processor, cause the at least one processor to perform operations. The operations include obtaining a natural language query provided by a user via a user interface of an application. The operations also include processing the natural language query to obtain one or more key query terms from the natural language query. The operations additionally include performing, based on the one or more key query terms, a relevance-ranked search on a plurality of documents to obtain a subset of the plurality of documents relevant to the natural language query. The operations further include extracting answers to the natural language query from relevant documents among the subset of documents. The operations further still include obtaining, using document links associated with the relevant documents from which the answers were extracted, graph data including i) nodes representing the relevant documents and entities identified in the relevant documents and ii) edges representing relationships between the relevant documents and the entities identified in the relevant documents. The operations additionally include generating, based on the graph data, a graph that includes the relationships between the relevant documents and the entities identified in the documents among the subset of documents. The operations further still include displaying the graph via the user interface of the application to enable the user to discover information previously unknown to the user.

In yet another embodiment, a computer readable storage medium storing computer-executable instructions is provided. The computer-executable instructions, when executed by at least one processor, cause a computer system to perform operations. The operations include obtaining a natural language query provided by a user via a user interface of an application. The operations also include processing the natural language query to obtain one or more key query terms from the natural language query. The operations additionally include performing, based on the one or more key query terms, a relevance-ranked search on a plurality of documents to obtain a subset of the plurality of documents relevant to the natural language query. The operations further include extracting answers to the natural language query from relevant documents among the subset of documents. The operations additionally include obtaining, using document links associated with the relevant documents from which the answers were extracted, graph data including i) nodes representing the relevant documents and entities identified in the relevant documents and ii) edges representing relationships between the relevant documents and the entities identified in the relevant documents. The operations further include generating, based on the graph data, a graph that includes the relationships between the relevant documents and the entities identified in the documents among the subset of documents. The operations further still include causing the graph to be displayed via the user interface of the application to enable the user to discover information previously unknown to the user.

In connection with any one of the aforementioned aspects, the systems, devices and/or methods described herein may alternatively or additionally include or involve any suitable combination of one or more of the following aspects or features.

Obtaining the natural language query comprises obtaining the natural language query in a particular natural language selected from among a plurality of natural languages supported by the application, wherein the particular natural language is selected by the user via the user interface of the application.

Processing the natural language query using a natural language processing model comprises processing the natural language query using a natural language processing model trained in the particular natural language selected by the user.

The plurality of documents is stored in a dataset in a data store, wherein respective ones of the documents are stored in association with vector embeddings generated based on the documents among the plurality of documents.

Performing the relevance-ranked search includes vectorizing the one or more key query terms obtained from the natural language query to generate vector embeddings based on the one or more key query terms, and querying the dataset using the vector embeddings generated based on the key query terms to identify the subset of documents relevant to the natural language query.

Extracting the answers to the natural language query from the relevant documents comprises processing the subset of documents using a pre-trained transformer model.

Extracting the answers to the natural language query comprises processing the subset of documents using a plurality of processors executing the pre-trained transformer model, such that answers from respective documents are extracted in parallel by respective ones of the plurality of processors.

The method further includes generating a document search results display to include i) the answers extracted from at least some documents among the subset of documents and ii) context windows including excerpts of the documents from which the answers were extracted, and causing the document search results display to be displayed to the user via the user interface of the application.

The method further includes generating relevance scores indicating confidence of the answers extracted from the documents, and generating the document search results display such that the answers are displayed in decreasing order of the relevance scores of the answers extracted from the documents.

Generating the document search results display comprises generating the document search results display to limit displayed answers to include only answers having relevance scores that exceed a minimum relevance score specified by the user via the user interface of the application.

The method further includes pre-processing the plurality of documents using one or more processing engines to identify the entities in the documents among the plurality of documents.

Pre-processing the plurality of documents includes pre-processing the plurality of documents using one or both of i) one or more regular expressions (REGEX) engines configured to match patterned data in content of the documents, ii) one or more named entity recognition (NER) engines configured to identify named entities in the content of the documents to extract entities from the content of the documents.

The method further includes obtaining, via the user interface, one or more graph search terms provided by the user, the one or more graph search terms specifying one or more targets of interest to the user in the subset of documents, and querying the graph data further using the one or more graph search terms to identify relationships of one or more nodes corresponding to the one or more targets of interest to the user.

The one or more graph search terms specify one or more of a name, an organization, and a location of interest to the user.

The method further includes obtaining, via the user interface, a user selection indicating a maximum number of nodes to be displayed in the graph, and generating the graph to include a number of nodes that does not exceed the maximum number of nodes specified by the user.

Generating the graph includes generating the graph to include a plurality of nodes including i) a node corresponding to a graph search term among the one or more graph search terms provided by the user and ii) one or more nodes corresponding to respective documents that include the graph search term.

Generating the graph includes detecting a selection of a node corresponding to a particular document that includes the graph search term, the selection provided by the user via the user interface, and, in response to detecting the selection of the node, expanding the graph to show one or more further nodes representing one or more entities identified in the particular document.

The method further includes prior to performing the relevance-ranked search on the plurality of documents, performing a search session, including: obtaining one or more seed terms provided by the user; transforming the one or more seed terms into one or more search terms; performing one or more search routines to obtain the plurality of documents based on the one or more search terms, wherein respective ones of the one or more search routines i) are performed using respective search engines and ii) generate search results identifying a plurality of web pages based on the search terms; processing content retrieved from the plurality of web pages to extract further information extracted from the web pages; and storing, in a data store, content retrieved from the plurality of web pages and the information extracted from the web pages as the plurality of documents in association with document links indicating where the documents were obtained in the one or more search routines.

The method further includes pre-processing the plurality of documents using one or more transformer models trained in one or more natural language supported by the application to generate vector embeddings based on the documents among the plurality of documents, and storing the vector embeddings in the data store in association with the corresponding documents.

The method further includes training a generative transformer model based on one or both of i) the relevant documents to from which the answers to the natural language query were extracted or ii) documents, among the relevant documents, identified based on the graph data to generate a generative pre-trained transformer model that is focused on a topic corresponding to the natural language query, wherein the generative pre-trained transformer model is to be used to provide answers to further natural language queries provided by the user.

The program instructions, when executed by the at least one processor, further cause the at least one processor to: pre-process, using one or more processing engines, the plurality of documents to identify entities in the plurality of documents; generate graph data to include i) nodes representing document links associated with the documents among the plurality of documents and the entities identified in the documents among the plurality of documents and ii) edges representing relationships between the documents and the entities identified in the documents among the plurality of documents; obtain, via the user interface, one or more graph search terms specifying one or more targets of interest to the user; query, using i) document links associated with respective documents, among the subset of documents and ii) the one or more graph search terms specifying one or more targets of interest to the user, the graph data to obtain graph data for generating the graph; generate the graph to include a plurality of nodes including i) a node corresponding to a graph search term among the one or more graph search terms specifying one or more targets of interest to the user and ii) one or more nodes corresponding to respective documents that include the graph search term; detect a selection of a node among the one or more nodes corresponding to respective documents that include the graph search term; and expand the graph to show one or more further nodes representing one or more entities identified in a document corresponding to the node selected by the user.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present disclosure has been described with reference to specific examples, which are intended to be illustrative only and not to be limiting of the present disclosure, changes, additions and/or deletions may be made to the disclosed embodiments without departing from the scope of the present disclosure.

What is claimed is:

1. A method for providing a visual representation of search results to a user of an application, the method comprising:

obtaining a natural language query provided by the user via a user interface of the application;

processing the natural language query to obtain one or more key query terms from the natural language query;

performing, based on the one or more key query terms, a relevance-ranked search on a plurality of documents to obtain a subset of the plurality of documents relevant to the natural language query;

extracting respective answers to the natural language query from respective relevant documents among the plurality of documents in the subset of documents;

obtaining, based on accessing a graph database using respective identifiers associated with the respective relevant documents from which the respective answers were extracted, graph data including i) nodes representing the relevant documents and entities identified in the relevant documents and ii) edges representing relationships between the relevant documents and the entities identified in the relevant documents;

generating, based on the graph data, a graph that includes the relationships between the relevant documents and the entities identified in the documents among the subset of documents; and causing the graph to be displayed via the user interface of the application to enable the user to discover information previously unknown to the user.

2. The method of claim 1, wherein:

obtaining the natural language query comprises obtaining the natural language query in a particular natural language selected from among a plurality of natural languages supported by the application, wherein the particular natural language is selected by the user via the user interface of the application; and processing the natural language query using a natural language processing model comprises processing the natural language query using a natural language processing model trained in the particular natural language selected by the user.

3. The method of claim 1, wherein:

the plurality of documents is stored in a dataset in a data store, wherein respective ones of the documents are stored in association with vector embeddings generated based on the documents among the plurality of documents; and performing the relevance-ranked search includes vectorizing the one or more key query terms obtained from the natural language query to generate vector embeddings based on the one or more key query terms, and querying the dataset using the vector embeddings generated based on the key query terms to identify the subset of documents relevant to the natural language query.

4. The method of claim 1, wherein extracting the respective answers to the natural language query comprises processing the subset of documents using a pre-trained transformer model.

5. The method of claim 4, wherein extracting the respective answers to the natural language query comprises processing the subset of documents using a plurality of processors executing the pre-trained transformer model, such that answers from respective documents are extracted in parallel by respective ones of the plurality of processors.

6. The method of claim 4, further comprising:

generating a document search results display to include i) the respective answers extracted from at least some documents among the subset of documents and ii) context windows including excerpts of the documents from which the respective answers were extracted; and causing the document search results display to be displayed to the user via the user interface of the application.

7. The method of claim 6, further comprising:

generating relevance scores indicating confidence of the respective answers extracted from the respective relevant documents; and generating the document search results display such that the respective answers are displayed in decreasing order of the relevance scores of the respective answers extracted from the respective relevant documents.

8. The method of claim 6, wherein generating the document search results display comprises generating the document search results display to limit displayed answers to include only answers having relevance scores that exceed a minimum relevance score specified by the user via the user interface of the application.

9. The method of claim 1, further comprising pre-processing the plurality of documents using one or more processing engines to identify the entities in the documents among the plurality of documents.

10. The method of claim 9, wherein pre-processing the plurality of documents includes pre-processing the plurality of documents using one or both of i) one or more regular expressions (REGEX) engines configured to match patterned data in content of the documents, ii) one or more named entity recognition (NER) engines configured to identify named entities in the content of the documents to extract entities from the content of the documents.

11. The method of claim 1, further comprising:

obtaining, via the user interface, one or more graph search terms provided by the user, the one or more graph search terms specifying one or more targets of interest to the user in the subset of documents; and querying the graph data further using the one or more graph search terms to identify relationships of one or more nodes corresponding to the one or more targets of interest to the user.

12. The method of claim 11, wherein the one or more graph search terms specify one or more of a name, an organization, and a location of interest to the user.

13. The method of claim 11, further comprising:

obtaining, via the user interface, a user selection indicating a maximum number of nodes to be displayed in the graph; and generating the graph to include a number of nodes that does not exceed the maximum number of nodes specified by the user.

14. The method of claim 11, wherein generating the graph includes:

generating the graph to include a plurality of nodes including i) a node corresponding to a graph search term among the one or more graph search terms provided by the user and ii) one or more nodes corresponding to respective documents that include the graph search term, detecting a selection of a node corresponding to a particular document that includes the graph search term, the selection provided by the user via the user interface, and in response to detecting the selection of the node, expanding the graph to show one or more further nodes representing one or more entities identified in the particular document.

15. The method of claim 1, further comprising:

prior to performing the relevance-ranked search on the plurality of documents, performing a search session, including obtaining one or more seed terms provided by the user, transforming the one or more seed terms into one or more search terms, performing one or more search routines to obtain the plurality of documents based on the one or more search terms, wherein respective ones of the one or more search routines i) are performed using respective search engines and ii) generate search results identifying a plurality of web pages based on the search terms, processing content retrieved from the plurality of web pages to extract further information extracted from the web pages, and storing, in a data store, content retrieved from the plurality of web pages and the information extracted from the web pages as the plurality of documents in association with document links indicating where the documents were obtained in the one or more search routines.

16. The method of claim 15, further comprising:

pre-processing the plurality of documents using one or more transformer models trained in one or more natural language supported by the application to generate vector embeddings based on the documents among the plurality of documents; and storing the vector embeddings in the data store in association with the corresponding documents.

17. The method of claim 1, further comprising training a generative transformer model based on one or both of i) the relevant documents to from which the respective answers to the natural language query were extracted or ii) documents, among the relevant documents, identified based on the graph data to generate a generative pre-trained transformer model that is focused on a topic corresponding to the natural language query, wherein the generative pre-trained transformer model is to be used to provide answers to further natural language queries provided by the user.

18. A system, comprising:

one or more non-transitory computer readable storage media; and program instructions, stored on the one or more non-transitory computer readable storage media, that, when executed by at least one processor, cause the at least one processor to obtain a natural language query provided by a user via a user interface of an application, process the natural language query to obtain one or more key query terms from the natural language query, perform, based on the one or more key query terms, a relevance-ranked search on a plurality of documents to obtain a subset of the plurality of documents relevant to the natural language query, extract respective answers to the natural language query from respective relevant documents among the plurality of documents in the subset of documents, obtain, based on accessing a graph database using respective identifiers associated with the respective relevant documents from which the respective answers were extracted, graph data including i) nodes representing the relevant documents and entities identified in the relevant documents and ii) edges representing relationships between the relevant documents and the entities identified in the relevant documents, generate, based on the graph data, a graph that includes the relationships between the relevant documents and the entities identified in the documents among the subset of documents, and display the graph via the user interface of the application to enable the user to discover information previously unknown to the user.

19. The system of claim 18, wherein the program instructions, when executed by the at least one processor, further cause the at least one processor to:

pre-process, using one or more processing engines, the plurality of documents to identify entities in the plurality of documents;

generate graph data to include i) nodes representing document links associated with the documents among the plurality of documents and the entities identified in the documents among the plurality of documents and ii) edges representing relationships between the documents and the entities identified in the documents among the plurality of documents;

obtain, via the user interface, one or more graph search terms specifying one or more targets of interest to the user;

query, using i) document links associated with respective documents, among the subset of documents and ii) the one or more graph search terms specifying one or more targets of interest to the user, the graph data to obtain graph data for generating the graph;

generate the graph to include a plurality of nodes including i) a node corresponding to a graph search term among the one or more graph search terms specifying one or more targets of interest to the user and ii) one or more nodes corresponding to respective documents that include the graph search term;

detect a selection of a node among the one or more nodes corresponding to respective documents that include the graph search term; and expand the graph to show one or more further nodes representing one or more entities identified in a document corresponding to the node selected by the user.

20. A non-transitory computer readable storage medium storing computer-executable instructions that, when executed by at least one processor, cause a computer system to:

obtain a natural language query provided by a user via a user interface of an application, process the natural language query to obtain one or more key query terms from the natural language query, perform, based on the one or more key query terms, a relevance-ranked search on a plurality of documents to obtain a subset of the plurality of documents relevant to the natural language query, extract respective answers to the natural language query from respective relevant documents among the plurality of documents in the subset of documents, obtain, based on accessing a graph database using respective identifiers associated with the respective relevant documents from which the respective answers were extracted, graph data including i) nodes representing the relevant documents and entities identified in the relevant documents and ii) edges representing relationships between the relevant documents and the entities identified in the relevant documents;

generate, based on the graph data, a graph that includes the relationships between the relevant documents and the entities identified in the documents among the subset of documents; and cause the graph to be displayed via the user interface of the application to enable the user to discover information previously unknown to the user.

* * * * *